(12) United States Patent
Sakioka et al.

(10) Patent No.: US 8,416,222 B2
(45) Date of Patent: Apr. 9, 2013

(54) DRIVING APPARATUS

(75) Inventors: Youji Sakioka, Kanagawa (JP); Eiji Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 12/148,756

(22) Filed: Apr. 22, 2008

(65) Prior Publication Data
US 2008/0284762 A1    Nov. 20, 2008

(30) Foreign Application Priority Data

May 17, 2007 (JP) ................................ P2007-132098
Aug. 8, 2007 (JP) ................................ P2007-206000

(51) Int. Cl.
*G06F 3/038* (2006.01)
(52) U.S. Cl.
USPC .......................................... 345/204; 345/205
(58) Field of Classification Search ........... 345/204–215
See application file for complete search history.

(56) References Cited

U.S. PATENT DOCUMENTS

2003/0210219 A1* 11/2003 Osame ............................ 345/92

FOREIGN PATENT DOCUMENTS

| JP | 07-023299 | 1/1995 |
|----|-----------|--------|
| JP | 08-084057 | 3/1996 |
| JP | 2001-217706 | 8/2001 |
| JP | 2002-077730 | 3/2002 |
| JP | 2007-110630 | 4/2007 |

OTHER PUBLICATIONS

Figure 1 from the instant application.

* cited by examiner

*Primary Examiner* — Kevin M Nguyen
*Assistant Examiner* — Cory Almeida
(74) *Attorney, Agent, or Firm* — Robert J. Depke; The Chicago Technology Law Group, LLC

(57) ABSTRACT

Disclosed herein is a driving apparatus for driving a pixel, including a first pMOS type transistor connected to a first potential a first nMOS type transistor connected in series to the first pMOS type transistor and connected to a second potential; and a control section configured to control the first pMOS type transistor and the first nMOS type transistor individually using a first on-signal for controlling the timing of turning on of one of the first pMOS type transistor and the first nMOS type transistor; a signal of a potential at a node between the first pMOS type transistor and the first nMOS type transistor being inputted as a driving signal for driving the pixel to the pixel.

6 Claims, 12 Drawing Sheets

DRIVING APPARATUS

CROSS REFERENCES TO RELATED APPLICATIONS

The present invention contains subject matter related to Japanese Patent Application JP 2007-206000 filed in the Japan Patent Office on Aug. 8, 2007, and Japanese Patent Application JP 2007-132098 filed in the Japan Patent Office on May, 17, 2007, the entire contents of which being incorporated herein by reference.

BACKGROUND OF THE INVENTION

1. Field of the Invention

This invention relates to a driving apparatus for driving a pixel.

2. Description of the Related Art

FIG. 1 shows an example of a configuration of a pixel driving circuit or V driving circuit of a CMOS (Complementary Metal Oxide Semiconductor) image sensor and particular shows a portion of a pixel driving circuit or V driving circuit wherein pixels in an nth row are driven for the convenience of illustration. Further, while, in FIG. 1, an AND circuit, an OR circuit and a NOT circuit are used for simplified description, an actual circuit is implemented not using AND, OR and NOT circuits but using NAND, NOR and NOT circuits.

Referring to FIG. 1, the pixel driving circuit 10 shown includes an address decoder 11, a timing adjustment section 12, a driver section 13 and a control section 14, and produces and outputs a transfer gate signal TR(n), a reset signal RST(n) and a select signal SEL(n) for driving the pixels in the nth row.

The address decoder 11 supplies a row selection signal φV_LINE(n) for selecting the pixels in the nth row as a driving target to the timing adjustment section 12 at a predetermined timing.

The timing adjustment section 12 adjusts the timing of production of the transfer gate signal TR(n), reset signal RST(n) and select signal SEL(n). In particular, the timing adjustment section 12 includes AND circuits 21 and 22, an OR circuit 23 and a NOT circuit 24 which cooperate to function as a logic gate circuit for adjusting the timing of production of the transfer gate signal TR(n). The timing adjustment section 12 further includes an AND circuit 25 and a NOT circuit 26 which cooperatively function as a logic gate circuit for adjusting the timing of production of the reset signal RST(n). The timing adjustment section 12 further includes an AND circuit 27 and a NOT circuit 28 which cooperatively function as a logic gate circuit for adjusting the timing of production of the select signal SEL(n).

The AND circuit 21 logically ANDs the row selection signal φV_LINE(n) inputted from the address decoder 11 and a timing signal φRTR inputted from the control section 14 and supplies a signal obtained by the logical ANDing to the OR circuit 23. The AND circuit 22 logically ANDs the row selection signal φV_LINE(n) inputted from the address decoder 11 and another timing signal φSTR inputted from the control section 14 and supplies a signal obtained by the logical ANDing to the OR circuit 23.

The OR circuit 23 logically ORs the signal supplied from the AND circuit 21 and the signal supplied from the AND circuit 22 and supplies a signal obtained by the logical ORing to the NOT circuit 24. The NOT circuit 24 operates logical negation of the signal supplied from the OR circuit 23 and supplies a signal obtained by the logical negation to the driver section 13. Consequently, the timing of production of the transfer gate signal TR(n) to be produced by the driver section 13 hereinafter described is controlled.

The AND circuit 25 logically ANDs the row selection signal φV_LINE(n) inputted from the address decoder 11 and a timing signal φRST inputted from the control section 14 and supplies a signal obtained by the logical ANDing to the NOT circuit 26. The NOT circuit 26 operates logical negation of the signal supplied from the AND circuit 25 and supplies a signal obtained by the logical negation to the driver section 13. As a result, the timing of production of the reset signal RST(n) to be produced by the driver section 13 is controlled.

The AND circuit 27 logically ANDs the row selection signal φV_LINE(n) inputted from the address decoder 11 and a timing signal φSEL inputted from the control section 14 and supplies a signal obtained by the logical ANDing to the NOT circuit 28. The NOT circuit 28 operates logical negation of the signal supplied from the AND circuit 27 and supplies a signal obtained by the logical negation to the driver section 13. Consequently, the timing of production of the select signal SEL(n) to be produced by the driver section 13 is controlled.

The driver section 13 produces and outputs the transfer gate signal TR(n), reset signal RST(n) and select signal SEL(n) in accordance with the signals supplied from the timing adjustment section 12.

In particular, in the driver section 13, a pMOS transistor 31 and an nMOS transistor 32 are connected in series. A potential VDD is connected as a potential of the high level to the source of the pMOS transistor 31, and a potential VSS is connected as a potential of the low level to the source of the nMOS transistor 32. A signal supplied from the NOT circuit 24 of the timing adjustment section 12 is supplied to the gate of the pMOS transistor 31 and the nMOS transistor 32. If the signal is a low-level signal, then the pMOS transistor 31 is placed into an on state, but if the signal is a high-level signal, then the nMOS transistor 32 is placed into an on state.

As a result, if the signal inputted to the gate is a low-level signal, then the potential at a point at which the drains of the pMOS transistor 31 and the nMOS transistor 32 are connected to each other becomes the potential VDD, but, if the signal inputted to the gate is a high-level signal, then the potential at the point becomes the potential VSS. The point mentioned is hereinafter referred to as transfer gate junction point. Then, a signal of the potential is applied as the transfer gate signal TR(n) to the transfer gate of the pixels in the nth row of a pixel section which is formed from a plurality of pixels. In this manner, the driver section 13 produces and outputs the transfer gate signal TR(n) in accordance with the signal supplied from the timing adjustment section 12.

Further, in the driver section 13, a PMOS transistor 33 and an nMOS transistor 34 are connected in series similarly to the pMOS transistor 31 and the nMOS transistor 32, and the potentials VDD and VSS are connected to the sources of the pMOS transistor 33 and the nMOS transistor 34, respectively. A signal supplied from the NOT circuit 26 of the timing adjustment section 12 is supplied to the gate of the pMOS transistor 33 and the nMOS transistor 34. Then, a signal of the potential at a point at which the drains of the pMOS transistor 33 and nMOS transistor 34 are connected to each other is inputted as the reset signal RST(n) to the pixels in the nth row of the pixel section. The point mentioned is hereinafter referred to as reset junction point. As a result, the reset signal RST(n) of the potential VDD or the potential VSS is inputted to the pixels in the nth row of the pixel section in accordance with the signal supplied from the timing adjustment section 12.

Furthermore, in the driver section 13, a pMOS transistor 35 and an nMOS transistor 36 are connected in series similarly to the pMOS transistor 31 and the nMOS transistor 32, and the potentials VDD and VSS are connected to the sources of the pMOS transistor 35 and the nMOS transistor 36, respectively. A signal supplied from the NOT circuit 28 of the timing adjustment section 12 is supplied to the gate of the pMOS transistor 35 and nMOS transistor 36. Then, a signal of the potential at a point at which the drains of the pMOS transistor 35 and the nMOS transistor 36 are connected to each other is inputted as the select signal SEL(n) to the pixels in the nth row of the pixel section. The point mentioned is hereinafter referred to as select junction point. As a result, the select signal SEL(n) of the potential VDD or the potential VSS is inputted to the pixels in the nth row of the pixel section in accordance with the signal supplied from the timing adjustment section 12.

The control section 14 produces the timing signals φSEL, φRST, φSTR and φRTR of the high level or the low level at predetermined timings and supplies the produced signals to the timing adjustment section 12.

Next, timings of signals relating to the output of the transfer gate signal TR(n) in the pixel driving circuit 10 in FIG. 1 is described with reference to FIG. 2.

If the level of the row selection signal φV_LINE(n) changes from the low level to the high level at time $t_1$ and then the level of the timing signal φSTR or the timing signal φRTR changes from the low level to the high level at time $t_2$, then the levels of the signals produced by the AND circuits 21 and 22, OR circuit 23 and NOT circuit 24 become the low level. Accordingly, the pMOS transistor 31 is placed into an on state and the nMOS transistor 32 is placed into an off state, and the transfer gate signal TR(n) of the potential VDD is outputted to the pixel section as seen in FIG. 2.

Then, if the level of the timing signal φSTR or the timing signal φRTR changes from the high level to the low level at time $t_3$ as seen in FIG. 2, then the levels of the signals produced by the AND circuits 21 and 22, OR circuit 23 and NOT circuit 24 become the high level. Accordingly, the PMOS transistor 31 is placed into an off state and the nMOS transistor 32 is placed into an on state, and the transfer gate signal TR(n) of the potential VSS is outputted to the pixel section as seen in FIG. 2.

Thereafter, although the level of the row selection signal φV_LINE(n) changes from the high level to the low level at time $t_4$ as seen in FIG. 2, the level of the signals produced by the AND circuits 21 and 22, OR circuit 23 and NOT circuit 24 is maintained at the high level. Accordingly, the transfer gate signal TR(n) of the potential VSS continues to be outputted to the pixel section as seen in FIG. 2.

It is to be noted that, while it is described above that the timing signal φSTR or the timing signal φRTR has the high level or else the low level, this description signifies both of a case wherein both of the timing signals φSTR and φRTR have the high level or the low level and another case wherein one of the timing signals φSTR and φRTR has the high level or the low level while the other one of the signals typically has the low level.

Further, though not shown, in the pixel driving circuit 10 shown in FIG. 1, also the potentials of the reset signal RST(n) and the select signal SEL(n) change to the potential VDD or the potential VSS in accordance with the level of the row selection signal φV_LINE(n) and the timing signal φSEL or the timing signal φRST similarly to the transfer gate signal TR(n).

Incidentally, in the pixel driving circuit 10 shown in FIG. 1, it is preferable to propagate the same signal inputted to the gate of the pMOS transistor 31, 33 or 35 and the nMOS transistor 32, 34 or 36 connected in series ideally at the completely same timing. However, there is the possibility that, upon changeover between on and off states of the pMOS transistor 31, 33 or 35 and the nMOS transistor 32, 34 or 36, the operation timings of them may be displaced from each other such that a moment occurs at which both of the PMOS transistor 31, 33 or 35 and the nMOS transistor 32, 34 or 36 are placed into an on state.

Meanwhile, a driving circuit which outputs three values such as high, middle and low levels as such a transfer gate signal TR(n) as described above depending upon a characteristic of a pixel is known and disclosed, for example, in Japanese Patent Laid-Open No. 2002-77730. Particularly in such a driving circuit of the type as described, the number of logic gates at the preceding stage of a pMOS transistor of a driver section and the number of logic gates at the preceding stage of an nMOS transistor of the driver section are frequently different from each other. Therefore, the possibility is high that some skew deviation may appear.

Further, the pMOS transistor 31, 33 or 35 and nMOS transistor 32, 34 or 36 of the driver section 13 of the pixel driving circuit 10 are designed normally using transistors having a high capacity in order to open and close the gate of pixels for one row at the same time. Therefore, there is the possibility that, if the operation timings of the pMOS transistor 31, 33 or 35 and the nMOS transistor 32, 34 or 36 of the driver section 13 are displaced from each other such that a moment occurs at which both of the pMOS transistor 31, 33 or 35 and the nMOS transistor 32, 34 or 36 are placed into an on state, then excessively high feedthrough current may flow from the potential VDD to the potential VSS.

Then, if high feedthrough current flows to the power supply of the low level of the potential VSS and this causes the low level to fluctuate, also the low level for pressing down the gate of pixels, for example, in a different row during a storage period fluctuates. Particularly where the negative potential generated by a charge pump incorporated in a chip in which the pixel driving circuit 10 is provided is determined as the potential VSS of the low level, there is the possibility that, depending upon the capacity of the charge pump, much time may be entailed until fluctuation of the negative potential by the feedthrough current is settled. As a result, a harmful influence appears on the picture quality to degrade the picture quality.

SUMMARY OF THE INVENTION

In this manner, in the pixel driving circuit 10 described above, there is the possibility that the feedthrough current may flow from the potential VDD to the potential VSS to cause the power supply of the low level of the potential VSS to fluctuate and have a harmful influence on the picture quality.

Therefore, it is demanded to prevent, where pixels are driven, fluctuation of the power supply of the low level to prevent degradation of the picture quality.

According to the embodiment of the present invention, there is provided a driving apparatus for driving a pixel, including a first PMOS transistor connected to a first potential, a first nMOS transistor connected in series to the first pMOS transistor and connected to a second potential, and a control section configured to control the first pMOS transistor and the first nMOS transistor individually using a first on-signal for controlling the timing of turning on of one of the first pMOS transistor and the first nMOS transistor, a signal of a potential at a node between the first pMOS transistor and the first nMOS transistor being inputted as a driving signal for driving the pixel to the pixel.

The control section may control the first pMOS transistor and the first nMOS transistor individually to control the length and the starting timing of a first potential period during which the potential at the node is the first potential, a second potential period during which the potential at the node is the second potential, and a high-impedance period during which the node is in a high-impedance state.

The control section may control the length and the starting timing of the first potential period, second potential period and high-impedance period so that the high-impedance period is provided upon transition from one of the first and second potential periods to the other one of the periods.

The driving apparatus may further include a second transistor which is one of a second pMOS transistor connected in parallel to the first pMOS transistor and connected to a third potential and a second nMOS transistor connected in parallel to the first nMOS transistor and connected to the third potential, the control section controlling the first pMOS transistor, first nMOS transistor and second transistor individually using the first on-signal and a second on-signal for controlling the timing of turning on of the second transistor, a signal of the potential at a node among the fist pMOS transistor, first nMOS transistor and second transistor being inputted as the driving signal to the pixel.

The control section may control the first pMOS transistor, first nMOS transistor and second transistor individually to control the length and the starting timing of a first potential period during which the potential at the node is the first potential, a second potential period during which the potential at the node is the second potential, a third potential period during which the potential at the node is the third potential, and a high-impedance period during which the node is in a high-impedance state.

The control section may control the length and the starting timing of the first, second, third potential periods and high-impedance period such that the high-impedance period is provided upon transition from one to a different one the first, second and third potential periods.

In the driving apparatus, the first pMOS transistor and the first nMOS transistor are controlled individually using the first on signal for controlling the timing at which one of the first pMOS transistor connected to the first potential and the first nMOS transistor connected in series to the first pMOS transistor and connected to the second potential is turned on. Further, a signal of the potential at the junction point between the first pMOS transistor and the first nMOS transistor is inputted as a driving signal for driving the pixels to the pixels.

With the driving apparatus, where pixels are driven, fluctuation of the power supply of the low level can be prevented to prevent degradation of the picture quality.

DETAILED DESCRIPTION OF THE PREFERRED EMBODIMENTS

Figure 1:
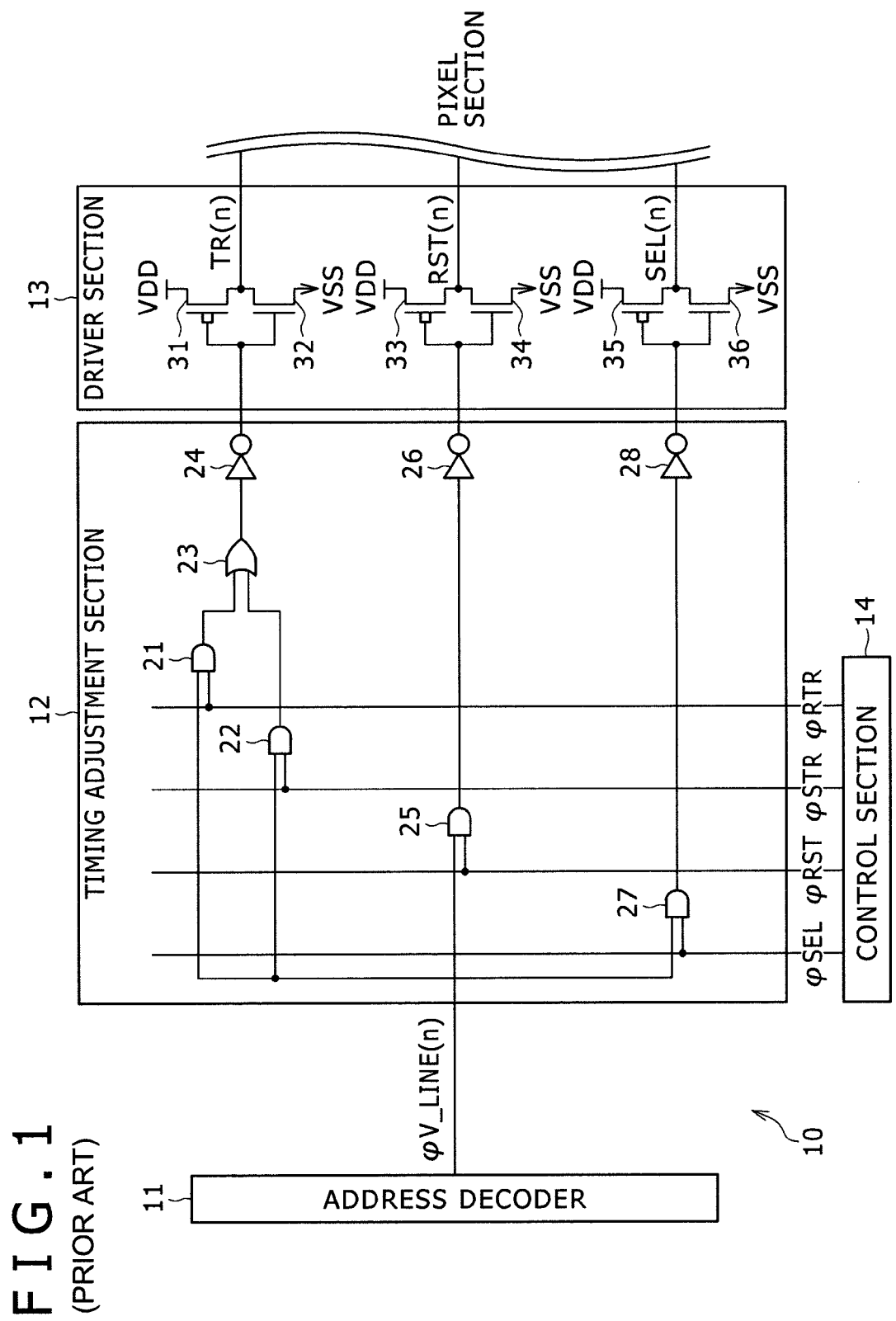
FIG. 1 is a circuit diagram showing an example of a configuration of a existing pixel driving circuit.
Figure 2:
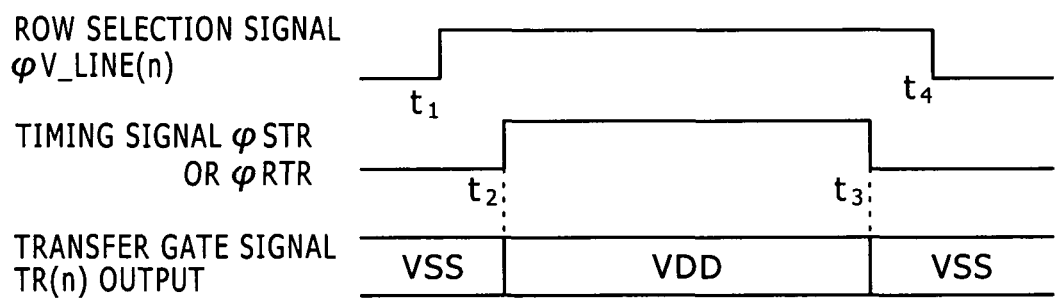
FIG. 2 is a timing chart illustrating timings of signals in the driving circuit in FIG. 1.

Before preferred embodiments of the present invention are described in detail, a corresponding relationship between several features set forth in the accompanying claims and particular elements of the preferred embodiments described below is described. The description, however, is merely for the confirmation that the particular elements which support the invention as set forth in the claims are disclosed in the description of the embodiment of the present invention. Accordingly, even if some particular element which is set forth in description of the embodiments is not set forth as one of the features in the following description, this does not signify that the particular element does not correspond to the feature. On the contrary, even if some particular element is set forth as an element corresponding to one of the features, this does not signify that the element does not correspond to any other feature than the element.

According to the embodiment of the present invention, there is provided a driving apparatus (for example, a pixel driving circuit 50 in FIG. 3) for driving a pixel, including a first pMOS transistor (for example, a pMOS transistor 31 in FIG. 3) connected to a first potential (for example, a potential VDD, a first nMOS transistor (for example, an nMOS transistor 32 in FIG. 3) connected in series to the first pMOS transistor and connected to a second potential (for example, a potential VSS), and a control section (for example, a timing adjustment section 51 in FIG. 3) configured to control the first pMOS transistor and the first nMOS transistor individually using a first on-signal (for example, an on signal φTR_PMOS) for controlling the timing of turning on of one of the first pMOS transistor and the first nMOS transistor, a signal of a potential at a node between the first pMOS transistor and the first nMOS transistor being inputted as a driving signal (for example, a transfer gate signal TR(n)) for driving the pixel to the pixel.

The driving apparatus may further including a second transistor (for example, a pMOS transistor 121 in FIG. 8) which is one of a second pMOS transistor connected in parallel to the first pMOS transistor and connected to a third potential and a second nMOS transistor connected in parallel to the first nMOS transistor and connected to the third potential, the control section controlling the first pMOS transistor, first nMOS transistor and second transistor individually using the first on-signal and a second on-signal for controlling the timing of turning on of the second transistor, a signal of the potential at a node among the fist pMOS transistor, first nMOS transistor and second transistor being inputted as the driving signal to the pixel.

In the following, particular embodiments according to the present invention are described in detail with reference to the drawings.

Figure 3:
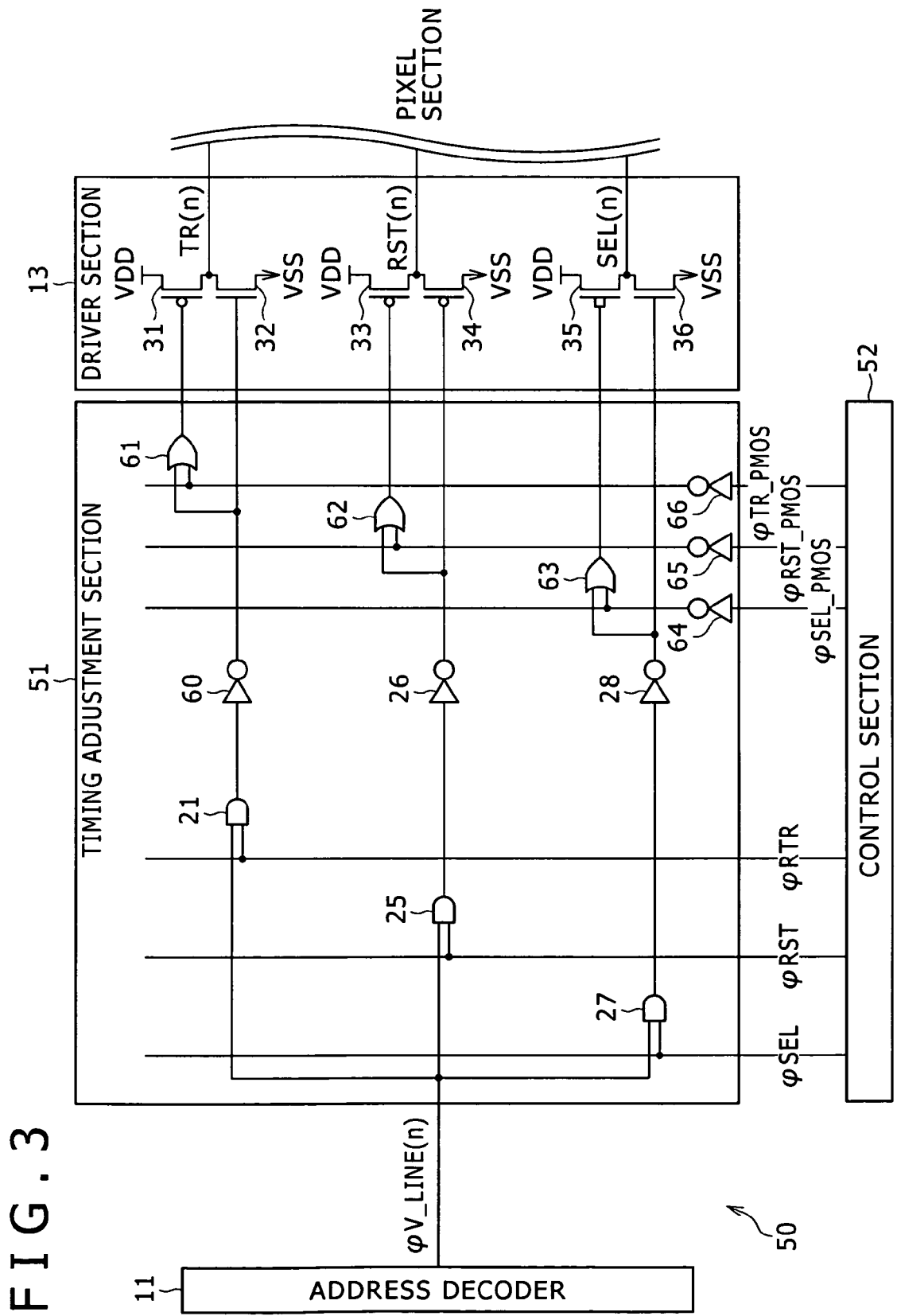
FIG. 3 is a circuit diagram showing an example of a configuration of a pixel driving circuit according to a first embodiment of the present invention.

FIG. 3 shows an example of a configuration of a pixel driving circuit of a CMOS image sensor according to a first embodiment of the present invention.

It is to be noted that, for the convenience of description, a portion of the pixel driving circuit including driving pixels in the nth row is shown in FIG. 3. Further, while, in FIG. 3, an AND circuit, an OR circuit and a NOT circuit are used for simplified illustration, an actual circuit can be implemented using a NAND circuit, a NOR circuit and a NOT circuit. This similarly applies also to a circuit hereinafter described with reference to FIG. 8.

Referring to FIG. 3, the pixel driving circuit 50 shown includes an address decoder 11, a driver section 13, a timing adjustment section 51 and a control section 52 and produces and outputs a transfer gate signal TR(n), a reset signal RST(n) and a select signal SEL(n). It is to be noted that the pixel driving circuit 50 includes several common components to those described hereinabove with reference to FIG. 1, and overlapping description of such common components is omitted herein to avoid redundancy.

The timing adjustment section 51 includes an AND circuit 21, a NOT circuit 60, an OR circuit 61 and another NOT circuit 66 which cooperatively function as a logic gate circuit for adjusting the timing of production of the transfer gate signal TR(n). The timing adjustment section 51 further includes an AND circuit 25, a NOT circuit 26, an OR circuit 62 and another NOT circuit 65 which cooperatively function as a logic gate circuit for adjusting the timing of production of the reset signal RST(n). The timing adjustment section 51 further includes an AND circuit 27, a NOT circuit 28, an OR circuit 63 and another NOT circuit 64 which cooperatively function as a logic gate circuit for adjusting the timing of production of the select signal SEL(n).

In particular, in the timing adjustment section 51, the OR circuits 61 to 63 and the NOT circuits 64 to 66 are disposed at the preceding stage to the driver section 13. Further, in the timing adjustment section 51, not the same signal is inputted to the pMOS transistor 31, 33 or 35 and the nMOS transistor 32, 34 or 36 of the driver section 13 but a signal obtained by logical ORing using a signal inputted to the nMOS transistor 32, 34 or 36 is inputted to the pMOS transistor 31, 33 or 35.

Further, in the timing adjustment section 51, the AND circuit 22 and the OR circuit 23 provided in the pixel driving circuit 10 in FIG. 1 are not provided, but a signal outputted from the AND circuit 21 is directly inputted to the NOT circuit 60. Accordingly, the timing signal φSTR need not be produced by the control section 52.

More particularly, the NOT circuit 60 of the timing adjustment section 51 operates logical negation of a signal supplied from the AND circuit 21 and outputs a signal obtained by the logical negation. The signal outputted from the NOT circuit 60 is inputted to the nMOS transistor 32 of the driver section 13 and also to the OR circuit 61. Further, an on signal φTR_PMOS outputted from the control section 52 for controlling the timing of turning on of the pMOS transistor 31 is inputted to the NOT circuit 66. Then, the NOT circuit 66 operates logical negation of the on signal φTR_PMOS and inputs a signal obtained by the logical negation to the OR circuit 61.

The OR circuit 61 logically ORs the signal outputted from the NOT circuit 60 and the signal outputted from the NOT circuit 66 and inputs a signal obtained by the logical ORing to the pMOS transistor 31. In particular, the OR circuit 61 produces, using the signal outputted from the NOT circuit 66, the signal to be inputted to the pMOS transistor 31 separately from the signal outputted from the NOT circuit 60 so as to be inputted to the nMOS transistor 32. Consequently, the timing adjustment section 51 can control the pMOS transistor 31 and the nMOS transistor 32 individually.

Meanwhile, a signal outputted from the NOT circuit 26 of the timing adjustment section 51 is inputted to the nMOS transistor 34 of the driver section 13 and also to the OR circuit 62. Further, an on signal φRST_PMOS outputted from the control section 52 for controlling the timing of turning on of the pMOS transistor 33 is inputted to the NOT circuit 65. The NOT circuit 65 operates logical negation of the on signal φRST_PMOS and inputs a signal obtained by the logical negation to the OR circuit 62.

The OR circuit 62 logically ORs the signal outputted from the NOT circuit 26 and the signal outputted from the NOT circuit 65 and inputs a signal obtained by the logical ORing to the pMOS transistor 33. As a result, the timing adjustment section 51 can control the pMOS transistor 33 and the nMOS transistor 34 individually.

Further, a signal outputted from the NOT circuit 28 of the timing adjustment section 51 is inputted to the nMOS transistor 36 of the driver section 13 and also to the OR circuit 63. Further, an on signal φSEL_PMOS outputted from the control section 52 for turning on of the pMOS transistor 35 is inputted to the NOT circuit 64. Then, the NOT circuit 64 operates logical negation of the on signal φSEL_PMOS and inputs a signal obtained by the logical negation to the OR circuit 63.

The OR circuit 63 logically ORs the signal outputted from the NOT circuit 28 and the signal outputted from the NOT circuit 64 and inputs a signal obtained by the logical ORing to the pMOS transistor 35. As a result, the timing adjustment section 51 can control the pMOS transistor 35 and the nMOS transistor 36 individually.

The control section 52 produces, at predetermined timings, and supplies timing signals φSEL, φRST and φRTR having the high level or the low level and the on signals φTR_PMOS, φRST_PMOS and φSEL_PMOS to the timing adjustment section 51.

Next, an example of timings of the signals relating to the output of the transfer gate signal TR(n) in the pixel driving circuit 50 in FIG. 3 is described with reference to FIG. 4.

If the level of the row selection signal φV_LINE(n) changes from the low level to the high level at time $t_{11}$ and then the level of the timing signal φRTR changes from the low level to the high level at time $t_{12}$, then the level of the signal produced by the AND circuit 21 and the NOT circuit 60 so as to be inputted to the nMOS transistor 32 becomes the low level. Further, at this time, if the level of the on signal φTR_PMOS is the low level as seen in FIG. 4, then the signal produced by the AND circuit 21, NOT circuit 60, OR circuit 61 and NOT circuit 66 so as to be inputted to the pMOS transistor 31 becomes the high level. Accordingly, both of the pMOS transistor 31 and the nMOS transistor 32 are placed into an off state and the transfer gate junction point is placed into a high-impedance (Hi-Z) state as seen in FIG. 4.

Figure 4:
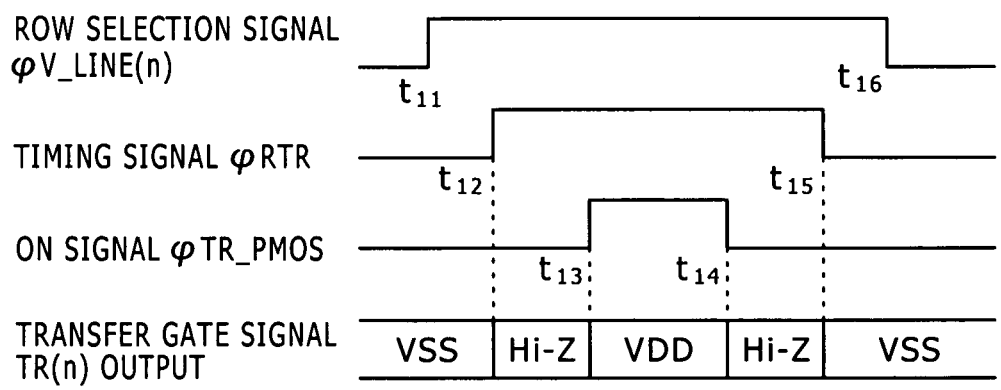
FIGS. 4 to 7 are timing charts illustrating different timing relationships of signals in the pixel driving circuit shown in FIG. 3.

Further, if the level of the on signal φTR_PMOS changes from the low level to the high level at time $t_{13}$ as seen in FIG. 4, then the level of the signal to be inputted to the pMOS transistor 31 changes to the low level while the signal to be inputted to the nMOS transistor 32 remains the low level. Accordingly, while the state of the nMOS transistor 32 remains in the off state, the pMOS transistor 31 is placed into an on state and the transfer gate signal TR(n) of the high level of the potential VDD is outputted to the pixel section.

As described above, when the level of the timing signal φRTR changes to the high level at time $t_{12}$, the nMOS transistor 32 is placed into an off state and the output of the transfer gate signal TR(n) of the low level of the potential VSS ends. However, the pMOS transistor 31 is not placed into an on state by time $t_{13}$ at which the level of the on signal φTR_PMOS changes to the high level. Therefore, the transfer gate junction point is placed into a high-impedance state.

Further, if the level of the on signal φTR_PMOS changes from the high level to the low level at time $t_{14}$ as seen in FIG. 4, then the level of the signal to be inputted to the pMOS transistor 31 returns to the high level while the level of the signal to be inputted to the nMOS transistor 32 remains the low level. Accordingly, while the nMOS transistor 32 remains in the off state, the state of the pMOS transistor 31 returns to the off state and the transfer gate junction point is placed into a high-impedance state again as seen in FIG. 4.

Then, if the level of the timing signal φRTR changes to the low level at time $t_{15}$ as seen in FIG. 4, then the level of the signal to be inputted to the nMOS transistor 32 becomes the high level. Further, at this time, if the level of the on signal φTR_PMOS remains the low level as seen in FIG. 4, then the level of the signal to be inputted to the pMOS transistor 31 becomes the high level. Accordingly, while the state of the pMOS transistor 31 remains the off state, the nMOS transistor 32 is placed into an on state and the transfer gate signal TR(n) of the low level of the potential VSS is outputted to the pixel section as seen in FIG. 4.

Then, although the level of the row selection signal φV_LINE(n) changes from the high level to the low level at time $t_{16}$ as seen in FIG. 4, if the levels of the timing signal φRTR and the on signal φTR_PMOS remain the low level, then the levels of the signals to be inputted individually to the pMOS transistor 31 and the nMOS transistor 32 remain the high level. Accordingly, the transfer gate signal TR(n) of the potential VSS continues to be outputted to the pixel section as seen in FIG. 4.

As described above, where the level of the transfer gate signal TR(n) is to change from the high level to the low level or conversely from the low level to the high level, the control section 52 changes the level of the on signal φTR_PMOS so that the transfer gate junction point is placed into a high-impedance state during the change in level just described. Consequently, upon the change just described, both of the pMOS transistor 31 and the nMOS transistor 32 are momentarily placed into an on state and flow of feedthrough current from the potential VDD to the potential VSS can be prevented.

As a result, fluctuation of the power supply of the low level is prevented. Further, particularly where the negative potential generated by the charge pump incorporated in the inside of the chip on which the pixel driving circuit 50 is provided is determined as the potential VSS of the low level, the load to the charge pump is eliminated. Accordingly, degradation of the picture quality in the pixel section can be prevented.

Further, the control section 52 can change the pulse length and the changeover timing of the level of the timing signal φRTR or the on signal φTR_PMOS so that the timings of starting and the periods or lengths of the period during which the potential of the transfer gate signal TR(n) is the potential VDD, the period during which the potential of the transfer gate signal TR(n) is the potential VSS and the period (hereinafter referred to as high-impedance period) during which the transfer gate junction point is in a high-impedance state can be changed. Change of the pulse length and the changeover timing of the level of the timing signal φRTR or the on signal φTR_PMOS can be carried out arbitrarily, for example, using a register (not shown) provided in the control section 52.

Figure 5:
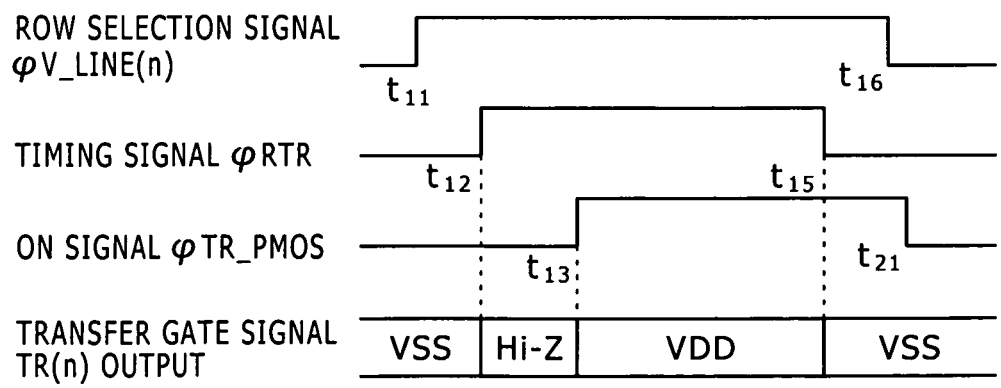

For example, where the level of the transfer gate signal TR(n) changes from the low level to the high level as seen in FIG. 5, the control section 52 can place the transfer gate junction point into a high-impedance state during the change just described thereby to suppress flow of feedthrough current. Also, where the level of the transfer gate signal TR(n) changes from the high level to the low level as seen in FIG. 6, the control section 52 can place the transfer gate junction point into a high-impedance state during the change just described thereby to suppress flow of feedthrough current.

In a case wherein the level of the transfer gate signal TR(n) changes from the low level to the high level as seen in FIG. 5, when the transfer gate junction point is to be placed into a high-impedance state during the change just described, the control section 52 changes the level of the on signal φTR_PMOS from the high level to the low level not at time $t_{14}$ before time $t_{15}$ but at time $t_{21}$ after time $t_{15}$. Consequently, since the pMOS transistor 31 is placed into an off state at the same time at which the nMOS transistor 32 is placed into an on state, where the level of the transfer gate signal TR(n) changes from the high level to the low level, the transfer gate junction point is not placed into a high-impedance state.

Figure 6:
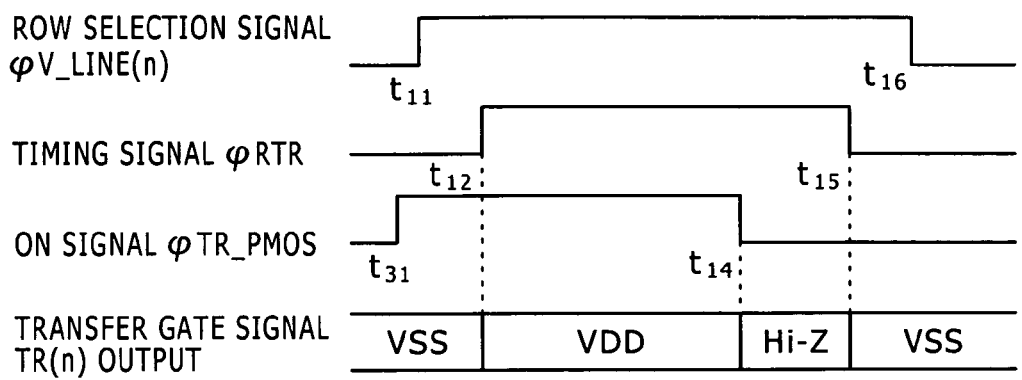

Further, in a case wherein the level of the transfer gate signal TR(n) changes from the high level to the low level as seen in FIG. 6, when the transfer gate junction point is to be placed into a high-impedance state during the change just described, the control section 52 changes the level of the on signal φTR_PMOS from the low level to the high level not at time $t_{13}$ after time $t_{12}$ but at time $t_{31}$ before time $t_{12}$. Consequently, since the pMOS transistor 31 is placed into an on state at the same time at which the nMOS transistor 32 is placed into an off state, the transfer gate junction point does not enter a high-impedance state where the level of the transfer gate signal TR(n) changes from the low level to the high level.

Figure 7:
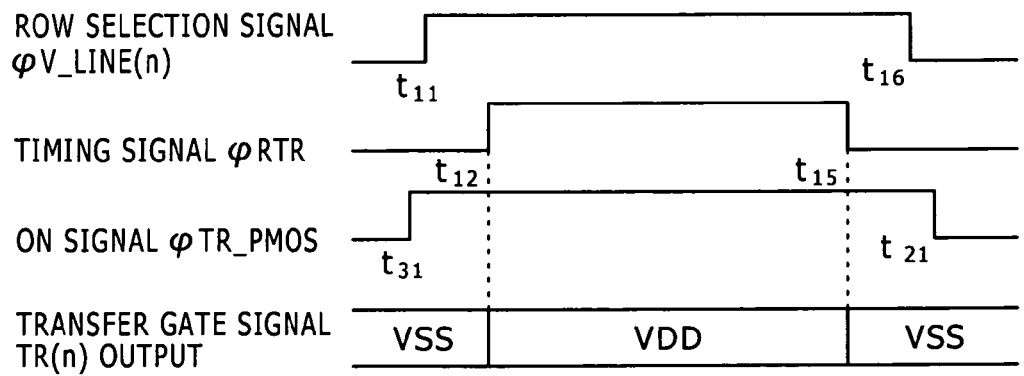

Further, where it is desired to attach greater importance to reduction of the high-impedance period to reduce the time or clock period than to prevention of the feedthrough current, in both of a case wherein the level of the transfer gate signal TR(n) is to be changed from the high level to the low level and another case wherein the level of the transfer gate signal TR(n) is to be changed from the low level to the high level as seen in FIG. 7, the control section 52 can prevent a phenomenon that the transfer gate junction point is placed into a high-impedance state during the change just described.

In this instance, the control section 52 changes the level of the on signal φTR_PMOS from the low level to the high level at time $t_{31}$ before time $t_{12}$ and changes the on signal φTR_PMOS from the high level to the low level at time $t_{21}$ after time $t_{15}$ as seen in FIG. 7. In particular, the control section 52 makes the length of the pulse of the on signal φTR_PMOS longer than the length of the pulse of the timing signal φRTR.

Further, while the level of the timing signal φRTR is the high level, the control section 52 can change the level of the on signal φTR_PMOS to change over the state of the pMOS transistor 31 between the on and off states so that a high-impedance period is provided or not provided. Accordingly, for example, while the level of the timing signal φRTR is the high level, it is possible to provide a plurality of high-impedance periods or not to provide any high-impedance period at all.

It is to be noted that, while the transfer gate signal TR(n) is described above, also with regard to the reset signal RST(n) and the select signal SEL(n), flow of the feedthrough current from the potential VDD to the potential VSS can be prevented similarly by causing the control section 52 to change the level of the on signals φRST_PMOS and φSEL_PMOS such that the reset junction point and the select junction point are placed into a high-impedance state during the change of the level of the reset signal RST(n) and the select signal SEL(n).

Figure 8:
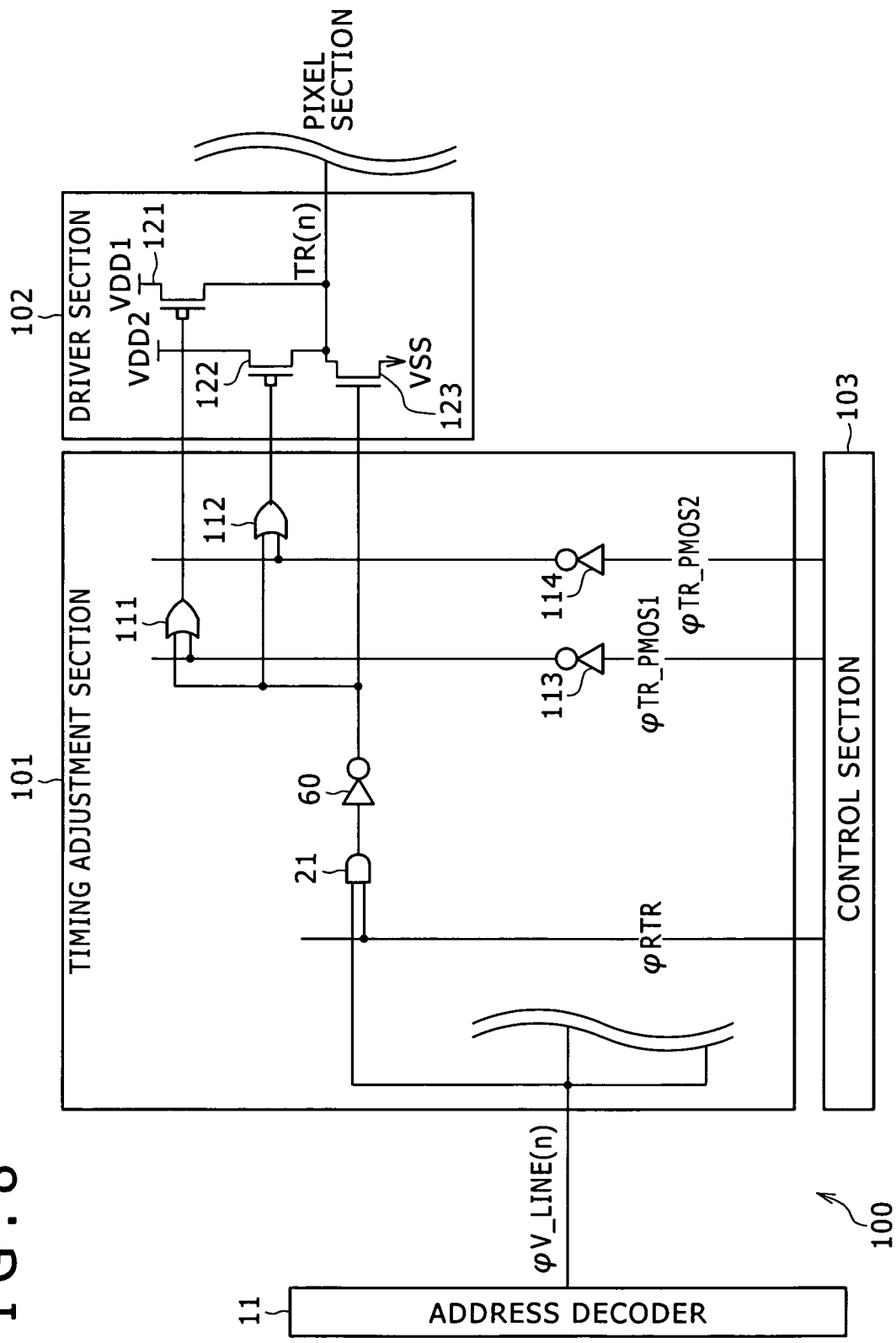
FIG. 8 is a circuit diagram showing an example of a configuration of a pixel driving circuit according to a second embodiment of the present invention.

FIG. 8 shows an example of a configuration of a pixel driving circuit of a CMOS image sensor according to a second embodiment of the present invention.

Referring to FIG. 8, the pixel driving circuit 100 shown includes an address decoder 11, a timing adjustment section 101, a driver section 102 and a control section 103. The pixel driving circuit 100 produces and outputs a transfer gate signal TR(n), a reset signal RST(n) and a select signal SEL(n) individually having a middle level as well as a transfer gate signal TR(n), a reset signal RST(n) and a select signal SEL(n) individually having the high level or the low level.

It is to be noted that, while a portion of the pixel driving circuit 100 which produces the transfer gate signal TR(n) is shown in FIG. 8 for the convenience of illustration, also the reset signal RST(n) and the select signal SEL(n) are produced and outputted similarly to the transfer gate signal TR(n). It is to be noted that the pixel driving circuit 100 includes several common components to those described hereinabove with reference to FIGS. 1 and 3, and overlapping description of such common components is omitted herein to avoid redundancy.

In order to adjust the timing of production of the transfer gate signal TR(n), in the timing adjustment section 101, two OR circuits 111 and 112 and two NOT circuits 113 and 114 are disposed at the preceding stage to the driver section 102. Further, the timing adjustment section 101 individually inputs signals to two pMOS transistors 121 and 122 and an nMOS transistor 123 of the driver section 102 for producing the transfer gate signal TR(n).

In particular, a signal outputted from the NOT circuit 60 of the timing adjustment section 101 is inputted to the nMOS transistor 123 of the driver section 102 and also to the OR circuits 111 and 112. Further, an on signal φTR_PMOS1 outputted from the control section 103 for controlling the timing of turning on of the pMOS transistor 121 is inputted to the NOT circuit 113, and the NOT circuit 113 operates logical negation of the on signal φTR_PMOS1 and inputs a signal obtained by the logical negation to the OR circuit 111. The OR circuit 111 logically ORs the signal outputted from the NOT circuit 60 and the signal outputted from the NOT circuit 113 and inputs a signal obtained by the logical ORing to the pMOS transistor 121.

Further, an on signal φTR_PMOS2 outputted from the control section 103 for controlling the timing of turning on of the pMOS transistor 122 is inputted to the NOT circuit 114, and the NOT circuit 114 operates logical negation of the on signal φTR_PMOS2 and inputs a signal obtained by the logical negation to the OR circuit 112. The OR circuit 112 logically ORs the signal outputted from the NOT circuit 60 and the signal outputted from the NOT circuit 114 and inputs a signal obtained by the logical ORing to the PMOS transistor 122.

As described above, the OR circuit 111 uses the signal outputted from the NOT circuit 113 to produce a signal to be inputted to the pMOS transistor 121 separately from the signal outputted from the NOT circuit 60 so as to be inputted to the nMOS transistor 123. Further, the OR circuit 112 uses the signal outputted from the NOT circuit 114 to produce a signal to be inputted to the pMOS transistor 122 separately from the signal to be inputted to the nMOS transistor 123. Consequently, the timing adjustment section 101 can control the pMOS transistors 121 and 122 and the nMOS transistor 123 individually.

The driver section 102 produces the transfer gate signal TR(n) and so forth in accordance with the signals supplied thereto from the timing adjustment section 101. In particular, in the driver section 102, the pMOS transistors 121 and 122 are connected in parallel, and the pMOS transistors 121 and 122 and the nMOS transistor 123 are connected in series. A potential VDD1 is connected as a high-level potential to the source of the pMOS transistor 121 and another potential VDD2 is connected as a middle-level potential to the source of the pMOS transistor 122. Further, the potential VSS is connected as a low-level potential to the source of the nMOS transistor 123.

The signals supplied from the OR circuits 111 and 112 and the NOT circuit 60 of the timing adjustment section 101 are inputted to the gates of the pMOS transistors 121 and 122 and the nMOS transistor 123, respectively.

The pMOS transistors 121 and 122 and the nMOS transistor 123 are placed into an on or off state in response to the level of the signals supplied to the individual gates thereof so that the potential at a point (hereinafter referred to as three-connection point) at which the drains of the pMOS transistors 121 and 122 and the nMOS transistor 123 are connected to each other is changed to the potential VDD1, the potential VDD2 or the potential VSS. Then, the signal whose potential is changed as just described is applied as the transfer gate signal TR(n) to the transfer gate of the pixels in the nth row of the pixel section. In this manner, in the driver section 102, the transfer gate signal TR(n) is produced and outputted in response to the signals supplied from the timing adjustment section 101.

The control section 103 produces the timing signal φRTR, on signal φTR_PMOS1, on signal φTR_PMOS2 and so forth individually having the high level or the low level at predetermined timings and supplies the signals to the timing adjustment section 101.

It is to be noted that, while the potential VDD2 is connected to the pMOS transistor 122 in FIG. 8, the potential VDD2 may be connected alternatively to an nMOS transistor. In this instance, the nMOS transistor to which the potential VDD2 is connected is connected in parallel to the nMOS transistor 123, and a signal obtained by inverting the signal outputted from the OR circuit 112 is inputted to the gate of the nMOS transistor.

Now, an example of timings of the signals relating to the output of the transfer gate signal TR(n) in the pixel driving circuit 100 in FIG. 8 is described with reference to FIG. 9.

Figure 9:
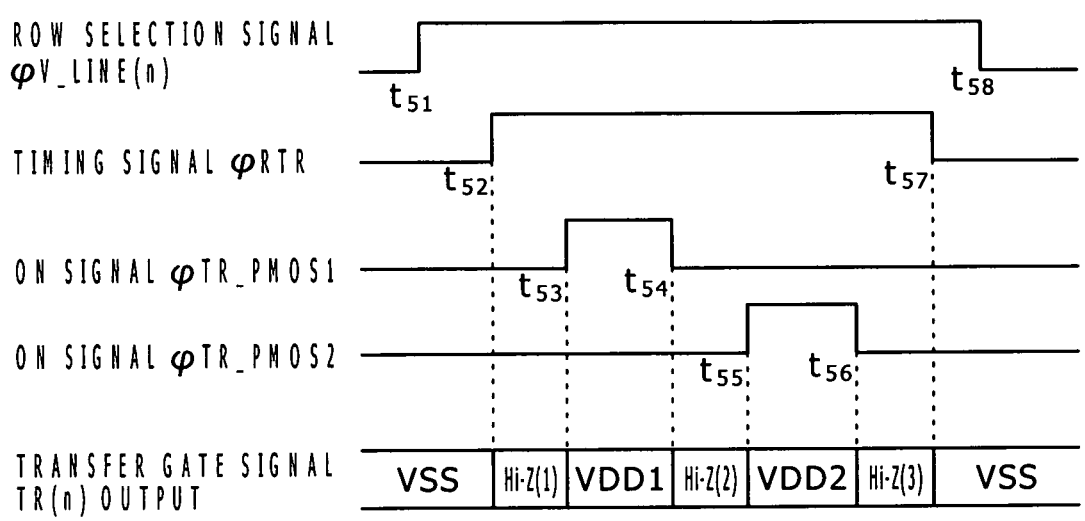
FIG. 9 is a timing chart illustrating timings of signals in the pixel driving circuit shown in FIG. 8.

If the level of the row selection signal φV_LINE(n) changes from the low level to the high level at time $t_{51}$ and then the level of the timing signal φRTR changes from the low level to the high level at time $t_{52}$ as seen in FIG. 9, then the level of the signal to be inputted to the nMOS transistor 123 becomes the low level. Further, at this time, if the levels of the on signals φTR_PMOS1 and φTR_PMOS2 are the low level as seen in FIG. 9, then both of the levels of the signals to be inputted to the pMOS transistors 121 and 122 change to the high level. Accordingly, the pMOS transistors 121 and 122 and the nMOS transistor 123 are placed into an off state, and the three-connection point is placed into a high-impedance (Hi-Z(1)) state.

Then, if the level of the on signal φTR_PMOS1 changes from the low level to the high level at time $t_{53}$ as seen in FIG. 9, then while the level of the signal to be inputted to the pMOS transistor 122 remains the high level and the level of the signal to be inputted to the nMOS transistor 123 remains the low level, the level of the signal to be inputted to the pMOS transistor 121 changes to the low level. Accordingly, while the states of the pMOS transistor 122 and the nMOS transistor 123 remain the off state, the pMOS transistor 121 is placed into an on state. Consequently, the transfer gate signal TR(n) of the high level of the potential VDD1 is outputted to the pixel section as seen in FIG. 9.

Although, when the level of the timing signal φRTR changes to the high level at time $t_{52}$, the nMOS transistor 123 is placed into an off state and the output of the transfer gate signal TR(n) of the low level of the potential VSS ends as described hereinabove, the pMOS transistor 121 or the pMOS transistor 122 is not placed into an on state by time $t_{53}$ at which the level of the on signal φTR_PMOS1 or the on signal φTR_PMOS2 becomes the high level. Therefore, the three-connection point is placed into a high-impedance state.

Then, if the level of the on signal φTR_PMOS1 returns from the high level to the low level at time $t_{54}$ as seen in FIG. 9, then while the level of the signals to be inputted to the pMOS transistor 122 and the nMOS transistor 123 does not change, the level of the signal to be inputted to the pMOS transistor 121 returns to the high level. Accordingly, while the pMOS transistor 122 and the nMOS transistor 123 remain in the off state, the pMOS transistor 121 returns to the off state, and the three-connection point is placed into a high-impedance (Hi-Z(2)) state as seen in FIG. 9.

As described above, the control section 103 can place the pMOS transistor 121 into an on state to change the level of the transfer gate signal TR(n) to the high level by changing the level of the on signal φTR_PMOS1 to the high level while the level of the timing signal φRTR remains the high level. Accordingly, the control section 103 can control the period during which the level of the on signal φTR_PMOS1 remains the high level while the level of the timing signal φRTR remains the high level thereby to control the on period of the pMOS transistor 121 to control the provision/omission, length and timing of starting of the high-level period during which the level of the transfer gate signal TR(n) is the high level.

Then, if the level of the on signal φTR_PMOS2 changes from the low level to the high level at time $t_{55}$ as seen in FIG. 9, then while the level of the signals to be inputted to the pMOS transistor 121 and the nMOS transistor 123 does not change, the level of the signal to be inputted to the pMOS transistor 122 changes to the low level. Accordingly, while the pMOS transistor 121 and the nMOS transistor 123 remain in the off state, the PMOS transistor 122 is placed into an on state, and the transfer gate signal TR(n) of the middle level of the potential VDD is outputted to the pixel section as seen in FIG. 9.

Then, if the level of the on signal φTR_PMOS2 returns from the high level to the low level at time $t_{56}$ as seen in FIG. 9, then while the level of the signals to be inputted to the pMOS transistor 121 and the nMOS transistor 123 does not change, the level of the signal to be inputted to the pMOS transistor 122 returns to the high level. Accordingly, while the pMOS transistor 121 and the nMOS transistor 123 remain in the off state, the pMOS transistor 122 returns to the off state, and the three-connection point is placed into a high-impedance (Hi-Z(3)) state as seen in FIG. 9.

In this manner, the control section 103 can change the level of the on signal φTR_PMOS2 to the high level while the level of the timing signal φRTR remains the high level thereby to place the pMOS transistor 122 into an on state to change the level of the transfer gate signal TR(n) to the middle level. Accordingly, the control section 103 can control the period during which the level of the on signal φTR_PMOS2 remains the high level while the level of the timing signal φRTR remains the high level thereby to control the on period of the pMOS transistor 122 to control the provision/omission, length and timing of starting of the middle-level period during which the level of the transfer gate signal TR(n) is the middle level.

Thereafter, if the level of the timing signal φRTR returns from the high level to the low level at time $t_{57}$ as seen in FIG. 9, then the level of the signal to be inputted to the nMOS transistor 123 changes to the high level. Further, at this time, if the level of the on signals φTR_PMOS1 and φTR_PMOS2 remains in the low level as seen in FIG. 9, then both of the levels of the signals to be inputted to the pMOS transistors 121 and 122 change to the high level. Accordingly, while the pMOS transistors 121 and 122 remain in the off state, the nMOS transistor 123 is placed into an on state, and the transfer gate signal TR(n) of the low level of the potential VSS is outputted to the pixel section as seen in FIG. 9.

Then, if, at time $t_{58}$, the level of the row selection signal φV_LINE(n) changes from the high level to the low level but the level of the timing signal φRTR and the on signals φTR_PMOS1 and φTR_PMOS2 remains the low level as seen in FIG. 9, then the level of all of the signals to be inputted to the pMOS transistors 121 and 122 and the nMOS transistor 123 remains the high level. Accordingly, the transfer gate signal TR(n) of the low level of the potential VSS continues to be outputted to the pixel section as seen in FIG. 9.

In this manner, in FIG. 9, where the level of the transfer gate signal TR(n) is changed from the low level to the high level, from the high level to the middle level or from the middle level to the low level, the level of the transfer gate signal TR(n) is changed so as to have a high-impedance state halfway during the change described above. In this manner, a period during which the three-connection point has a high-impedance state can be provided during the change described above so as to prevent flow of the feedthrough current from the potential VDD to the potential VSS during the change.

Further, a period during which the level of both of the on signals φTR_PMOS1 and φTR_PMOS2 is placed into the low level while the level of the timing signal φRTR is the high level as seen in FIG. 9 is the period during which the three-connection point should have a high-impedance state. Accordingly, the changeover timing and the pulse period of the level of the on signals φTR_PMOS1 and φTR_PMOS2 can be changed so that a period of an arbitrary length during which the three-connection point has a high-impedance state is provided at an arbitrary timing.

For example, it is possible to provide the high-impedance period Hi-Z(1) alone, the period Hi-Z(2) alone, the period Hi-Z(3) alone, the periods Hi-Z(1) and Hi-Z(2) alone, the periods Hi-Z(1) and Hi-Z(3) alone or the periods Hi-Z(2) and Hi-Z(3) alone. Further, where it is desired to attach greater importance to reduction of the high-impedance period to reduce time than to prevention of the feedthrough current, the control section 103 can provide no high-impedance period at all.

It is to be noted that, while the AND circuit 22 and the OR circuit 23 in FIG. 1 are not provided in any of the pixel driving circuits 50 and 100 described above, they may otherwise be provided similarly as in the pixel driving circuit 10 in FIG. 1. A pixel driving circuit configured in such a manner as just described is described below.

Figure 10:
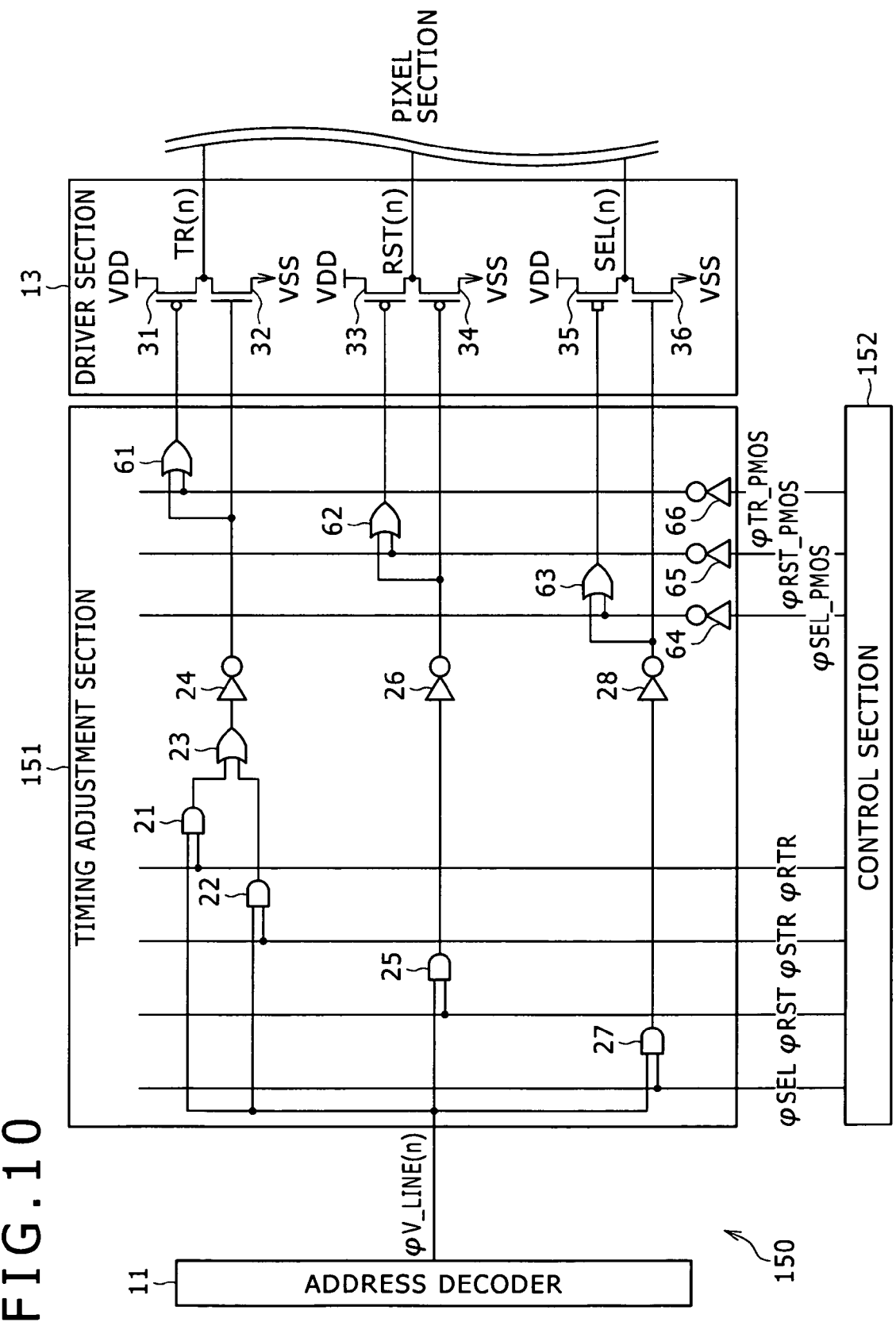
FIG. 10 is a circuit diagram showing an example of a configuration of a pixel driving circuit according to a third embodiment of the present invention.

FIG. 10 shows an example of a configuration of a pixel driving circuit of a CMOS image sensor according to a third embodiment of the present invention.

It is to be noted that a portion of the pixel driving circuit for driving pixels in the nth low is shown in FIG. 10, for the convenience of illustration. Further, while, in FIG. 10, an AND circuit, an OR circuit and a NOT circuit are used for simplified illustration, an actual circuit can be implemented using a NAND circuit, a NOR circuit and a NOT circuit. This similarly applies also to a circuit hereinafter described with reference to FIG. 15.

The pixel driving circuit 150 in FIG. 10 includes an address decoder 11, a driver section 13, a timing adjustment section 151 and a control section 152, and produces and outputs a transfer gate signal TR(n), a reset signal RST(n) and a select signal SEL(n). It is to be noted that the pixel driving circuit 150 includes several common components to those described hereinabove with reference to FIGS. 1 and 3, and overlapping description of such common components is omitted herein to avoid redundancy.

The timing adjustment section 151 includes an AND circuit 21, another AND circuit 22, an OR circuit 23, a NOT circuit 24, another OR circuit 61 and a NOT circuit 66 which cooperatively function as a logic gate circuit for adjusting the timing of production of the transfer gate signal TR(n). The timing adjustment section 151 further includes an AND circuit 25, a NOT circuit 26, an OR circuit 62 and another NOT circuit 65 which cooperatively function as a logic gate circuit for adjusting the timing of production of the reset signal RST(n). The timing adjustment section 151 further includes an AND circuit 27, a NOT circuit 28, an OR circuit 63 and another NOT circuit 64 which cooperatively function as a logic gate circuit for adjusting the timing of production of the select signal SEL(n).

In particular, in the timing adjustment section 151, the OR circuits 61 to 63 and the NOT circuit 64 to 66 are disposed at the preceding stage to the driver section 13. Further, in the timing adjustment section 151, not the same signal is inputted to the pMOS transistor 31, 33 or 35 and the nMOS transistor 32, 34 or 36 of the driver section 13 but a signal obtained by logical ORing using a signal to be inputted to the nMOS transistor 32, 34 or 36 is inputted to the pMOS transistor 31, 33 or 35.

In particular, a signal outputted from the NOT circuit 24 of the timing adjustment section 151 is inputted to the nMOS transistor 32 of the driver section 13 and also to the OR circuit 61. Further, an on signal φTR_PMOS outputted from the control section 152 for controlling the timing of turning on of the pMOS transistor 31 is inputted to the NOT circuit 66. The NOT circuit 66 operates logical negation of the on signal φTR_PMOS and inputs a signal obtained by the logical negation to the OR circuit 61.

The OR circuit 61 logically ORs the signal outputted from the NOT circuit 24 and the signal outputted from the NOT circuit 66 and inputs a signal obtained by the logical ORing to the pMOS transistor 31. In particular, the OR circuit 61 uses the signal outputted from the NOT circuit 66 to produce a signal to be inputted to the pMOS transistor 31 separately from the signal outputted from the NOT circuit 24 so as to be inputted to the nMOS transistor 32. Consequently, the timing adjustment section 151 can control the pMOS transistor 31 and the nMOS transistor 32 individually.

Further, a signal outputted from the NOT circuit 26 of the timing adjustment section 151 is inputted to the nMOS transistor 34 of the driver section 13 and also to the OR circuit 62. Further, an on signal φRST_PMOS outputted from the control section 152 for controlling the timing of turning on of the pMOS transistor 33 is inputted to the NOT circuit 65. Then, the NOT circuit 65 operates logical negation of the on signal φRST_PMOS and inputs a signal obtained by the logical negation to the OR circuit 62.

The OR circuit 62 logically ORs the signal outputted from the NOT circuit 26 and the signal outputted from the NOT circuit 65 and inputs a signal obtained by the logical ORing to the pMOS transistor 33. As a result, the timing adjustment section 151 can control the pMOS transistor 33 and the nMOS transistor 34 individually.

Further, a signal outputted from the NOT circuit 28 of the timing adjustment section 151 is inputted to the nMOS transistor 36 of the driver section 13 and also to the OR circuit 63. Further, an on signal φSEL_PMOS outputted from the control section 152 for controlling the timing of turning on of the pMOS transistor 35 is inputted to the NOT circuit 64. Then, the NOT circuit 64 operates logical negation of the on signal φSEL_PMOS and inputs a signal obtained by the logical negation to the OR circuit 63.

The OR circuit 63 logically ORs the signal outputted from the NOT circuit 28 and the signal outputted from the NOT circuit 64 and inputs a signal obtained by the logical ORing to the pMOS transistor 35. As a result, the timing adjustment section 151 can control the pMOS transistor 35 and the nMOS transistor 36 individually.

The control section 152 produces and supplies the timing signals φSEL, φRST, φSTR and φRTR and the on signals φTR_PMOS, φRST_PMOS and φSEL_PMOS individually having the high level or the low level at predetermined timings to the timing adjustment section 151.

Now, an example of timings of the signals relating to the output of the transfer gate signal TR(n) in the pixel driving circuit 150 in FIG. 10 is described with reference to FIG. 11.

Figure 11:
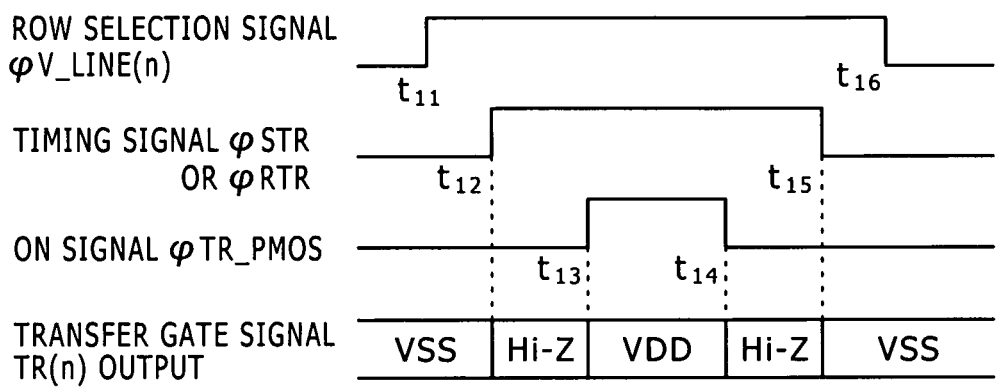
FIGS. 11 to 14 are timing charts illustrating different timing relationships of signals in the pixel driving circuit shown in FIG. 10.

If the level of the row selection signal φV_LINE(n) changes from the low level to the high level at time t11 and then the level of the timing signal φSTR or the timing signal φRTR changes from the low level to the high level at time $t_{12}$ as seen in FIG. 11, then the levels of the signals produced by the AND circuits 21 and 22, OR circuit 23 and NOT circuit 24 so as to be inputted to the nMOS transistor 32 change to the low level. Further, at this time, if the level of the on signal φTR_PMOS is the low level as seen in FIG. 11, then the level of the signals produced by the AND circuits 21 and 22, OR circuit 23, NOT circuit 24, OR circuit 61 and NOT circuit 66 so as to be inputted to the pMOS transistor 31 change to the high level as seen in FIG. 11. Accordingly, both of the pMOS transistor 31 and the nMOS transistor 32 are placed into an off state, and the transfer gate junction point is placed into a high-impedance (Hi-Z) state as seen in FIG. 11.

Then, if the level of the on signal φTR_PMOS changes from the low level to the high level at time $t_{13}$ as seen in FIG. 11, then the level of the signal to be inputted to the nMOS transistor 32 remains the low level although the level of the signal to be inputted to the PMOS transistor 31 changes to the low level. Accordingly, while the nMOS transistor 32 remains in the off state, the pMOS transistor 31 is placed into an on state, and the transfer gate signal TR(n) of the high level of the potential VDD is outputted to the pixel section as seen in FIG. 11.

In this manner, if the level of the timing signal φSTR or the timing signal φRTR changes to the high level at time $t_{12}$, then although the nMOS transistor 32 is placed into an off state and the output of the transfer gate signal TR(n) of the low level of the potential VSS ends, the pMOS transistor 31 is not placed into an on state by time $t_{13}$ at which the level of the on signal φTR_PMOS becomes the high level. Therefore, the transfer gate junction point is placed into a high-impedance state.

Then, if the level of the on signal φTR_PMOS changes from the high level to the low level at time $t_{14}$ as seen in FIG. 11, then the level of the signal to be inputted to the nMOS transistor 32 remains the low level but the level of the signal to be inputted to the pMOS transistor 31 returns to the high level. Accordingly, while the nMOS transistor 32 remains in the off state, the state of the pMOS transistor 31 returns to the off state, and the transfer gate junction point is placed into a high-impedance state again as seen in FIG. 11.

Then, if the level of the timing signal φSTR or the timing signal φRTR changes to the low level at time $t_{15}$ as seen in FIG. 11, then the level of the signal to be inputted to the nMOS transistor 32 changes to the high level. Further, at this time, if the level of the on signal φTR_PMOS remains the low level as seen in FIG. 11, then the level of the signal to be inputted to the pMOS transistor 31 changes to the high level. Accordingly, while the pMOS transistor 31 remains in the off state, the nMOS transistor 32 is placed into an on state, and the transfer gate signal TR(n) of the low level of the potential VSS is outputted to the pixel section as seen in FIG. 11.

Then, while the level of the row selection signal φV_LINE (n) changes from the high level to the low level at time $t_{16}$ as seen in FIG. 11, if the level of the timing signal φSTR or the timing signal φRTR and the on signal φTR_PMOS remains the low level, then the level of the signals to be inputted to the pMOS transistor 31 and the nMOS transistor 32 remains the high level. Accordingly, the transfer gate signal TR(n) of the potential VSS is outputted to the pixel section as seen in FIG. 11.

In this manner, where the level of the transfer gate signal TR(n) is changed from the high level to the low level and from the low level to the high level, the control section 152 changes the level of the on signal φTR_PMOS so that the transfer gate junction point is placed into a high-impedance state during the change just described. Consequently, upon the change, both of the pMOS transistor 31 and the nMOS transistor 32 are momentarily placed into an on state and flow of the feedthrough current from the potential VDD to the potential VSS can be prevented.

As a result, fluctuation of the power supply at the low level is prevented. Further, particularly where the negative potential generated by the charge pump incorporated in the inside of the chip on which the pixel driving circuit 150 is provided is set as the potential VSS of the low level, the load to the charge pump is eliminated. Accordingly, degradation of the picture quality of the pixel section can be prevented.

Further, the control section 152 can change the changeover timing of the level and the pulse length of the timing signal φSTR, timing signal φRTR or on signal φTR_PMOS to change the starting timing and the period or length of the period during which the potential of the transfer gate signal TR(n) is the potential VDD, the period during which the potential of the transfer gate signal TR(n) is the potential VSS and the period (hereinafter referred to as high-impedance period) during which the transfer gate junction point is in a high-impedance state. The change of the changeover timing of the level and the pulse length of the timing signal φSTR, timing signal φRTR or on signal φTR_PMOS can be carried out arbitrarily, for example, using a register (not shown) provided in the control section 152.

Figure 12:
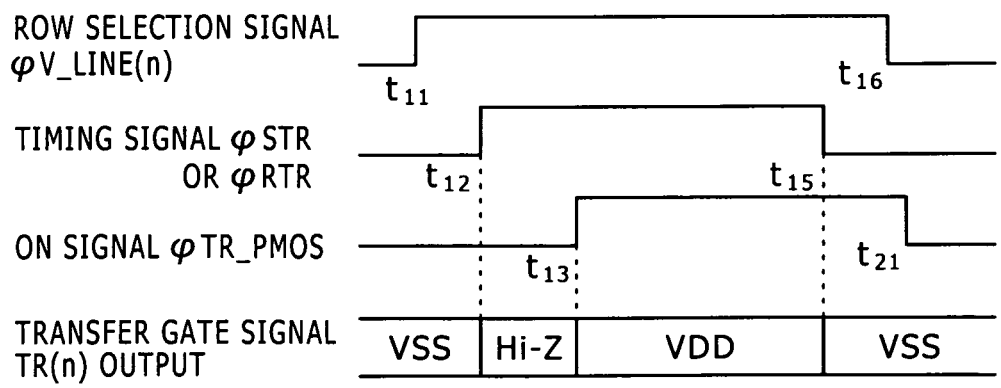

For example, where the level of the transfer gate signal TR(n) changes from the low level to the high level as seen in FIG. 12, the control section 152 can place the transfer gate junction point into a high-impedance state during the change just described to suppress flow of the feedthrough current. Further, where the level of the transfer gate signal TR(n) changes from the high level to the low level as seen in FIG. 13, the control section 152 can place the transfer gate junction point into a high-impedance state during the change just described to suppress flow of the feedthrough current.

As shown in FIG. 12, where the level of the transfer gate signal TR(n) is changed from the low level to the high level, where the transfer gate junction point is to be placed into a high-impedance state during the change just described, the control section 152 changes the level of the on signal φTR_PMOS from the high level to the low level not at time $t_{14}$ before time $t_{15}$ but at time $t_{21}$ after time $t_{15}$. Consequently, since the pMOS transistor 31 is placed into an off state at the same time at which the nMOS transistor 32 is placed into an on state, the transfer gate junction point is not placed into a high-impedance state where the level of the transfer gate signal TR(n) changes from the high level to the low level.

Figure 13:
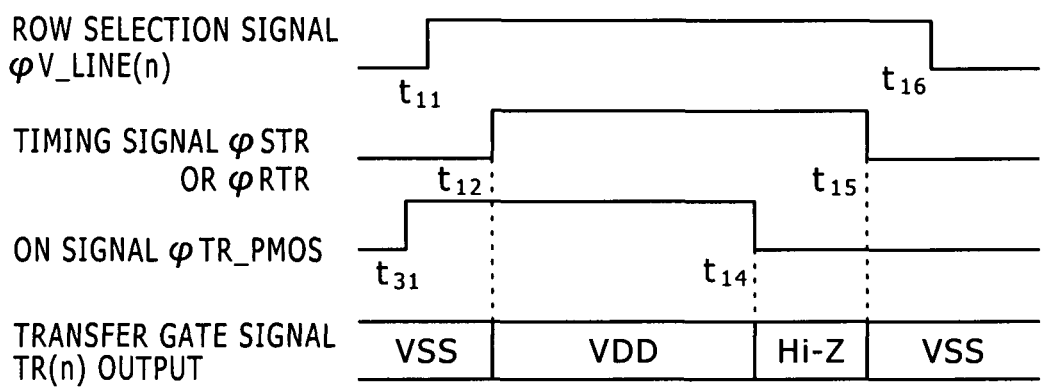

Further, where the level of the transfer gate signal TR(n) is changed from the high level to the low level as seen in FIG. 13, when the transfer gate junction point is to be placed into a high-impedance state during the change just described, the control section 152 changes the level of the on signal φTR_PMOS from the low level to the high level not at time $t_{13}$ after time $t_{12}$ but at time $t_{31}$ before time $t_{12}$. Consequently, since the pMOS transistor 31 is placed into an on state at the same time at which the nMOS transistor 32 is placed into an off state, the transfer gate junction point is not placed into a high-impedance state where the level of the transfer gate signal TR(n) changes from the low level to the high level.

Figure 14:
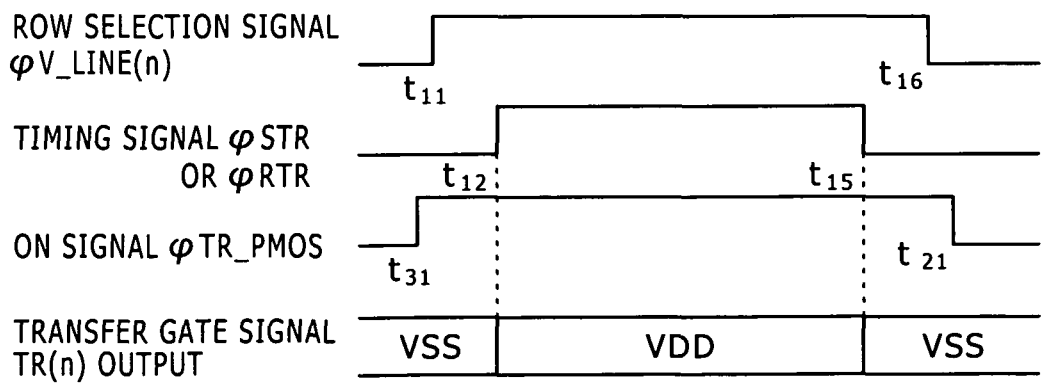

Further, where it is desired to attach greater importance to reduction of the high-impedance period to reduce time or clock period than to prevention of the feedthrough current, in both of a case wherein the level of the transfer gate signal TR(n) is to be changed from the high level to the low level and another case wherein the level of the transfer gate signal TR(n) is to be changed from the low level to the high level as seen in FIG. 14, the control section 152 can prevent a phenomenon that the transfer gate junction point is placed into a high-impedance state during the change just described.

In this instance, the control section 152 changes the level of the on signal φTR_PMOS from the low level to the high level at time $t_{31}$ before time $t_{12}$ and changes the level of the on signal φTR_PMOS from the high level to the low level at time $t_{21}$ after time $t_{15}$ as seen in FIG. 14. In particular, the control section 152 sets the length of the pulse of the on signal φTR_PMOS longer than the length of the pulse of the timing signal φSTR or the timing signal φRTR.

Further, while the level of the timing signal φSTR or the timing signal φRTR remains the high level, the control section 152 can change the level of the on signal φTR_PMOS to change over the pMOS transistor 31 between the on and off states so as to provide or not provide a high-impedance period. Accordingly, for example, while the level of the timing signal φSTR or the timing signal φRTR is the high level, it is possible to provide a plurality of high-impedance periods or not to provide any high-impedance period at all.

It is to be noted that, while the transfer gate signal TR(n) is described above, also with regard to the reset signal RST(n) and the select signal SEL(n), flow of the feedthrough current from the potential VDD to the potential VSS can be prevented similarly by causing the control section 152 to change the levels of the on signals φRST_PMOS and φSEL_PMOS such that the reset junction point and the select junction point are placed into a high-impedance state during the change of the level of the reset signal RST(n) and the select signal SEL(n).

Figure 15:
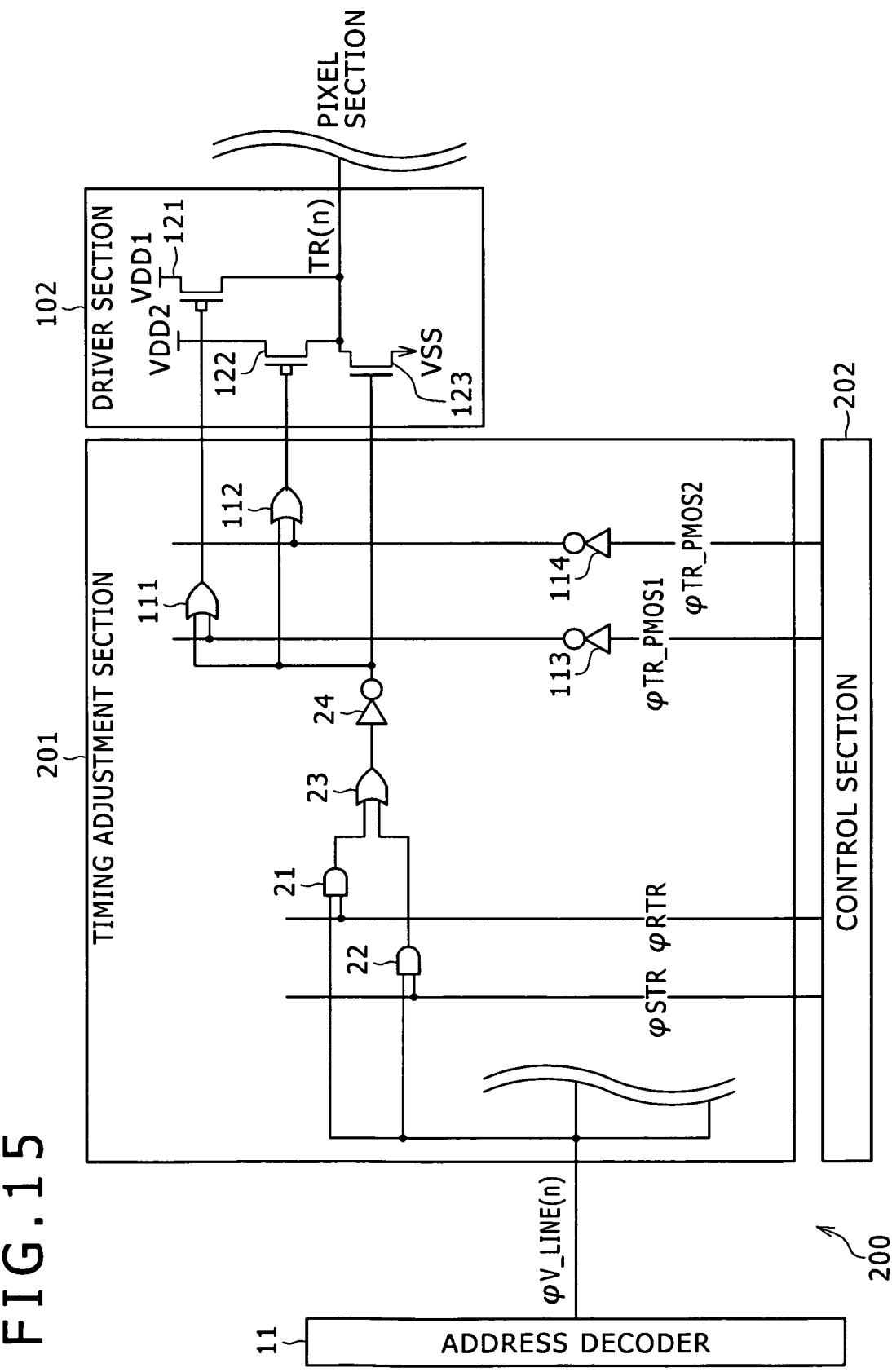
FIG. 15 is a circuit diagram showing an example of a configuration of a pixel driving circuit according to a fourth embodiment of the present invention.

FIG. 15 shows an example of a configuration of a pixel driving circuit of a CMOS image sensor according to a fourth embodiment of the present invention.

Referring to FIG. 15, the pixel driving circuit 200 includes an address decoder 11, a timing adjustment section 201, a driver section 102 and a control section 202. The pixel driving circuit 200 produces and outputs a transfer gate signal TR(n), a reset signal RST(n) and a select signal SEL(n) individually having a middle level as well as a transfer gate signal TR(n), a reset signal RST(n) and a select signal SEL(n) individually having the high level or the low level.

It is to be noted that, while a portion of the pixel driving circuit 200 for producing the transfer gate signal TR(n) is shown in FIG. 15 for the convenience of illustration, also the reset signal RST(n) and the select signal SEL(n) are produced and outputted similarly to the transfer gate signal TR(n). It is to be noted that the pixel driving circuit 200 includes several common components to those described hereinabove with reference to FIGS. 1 and 8, and overlapping description of such common components is omitted herein to avoid redundancy.

In the timing adjustment section 201, in order to adjust the timing of production of the transfer gate signal TR(n), two OR circuits 111 and 112 and two NOT circuits 113 and 114 are disposed at the preceding stage to the driver section 102. The timing adjustment section 201 inputs signals individually to two pMOS transistors 121 and 122 and an nMOS transistor 123 of the driver section 102 for producing the transfer gate signal TR(n).

In particular, the signal outputted from the NOT circuit 24 of the timing adjustment section 201 is inputted to the nMOS transistor 123 of the driver section 102 and also to the OR circuits 111 and 112. Further, the on signal φTR_PMOS1 outputted from the control section 202 for controlling the timing of turning on of the pMOS transistor 121 is inputted to the NOT circuit 113. The NOT circuit 113 operates logical negation of the on signal φTR_PMOS1 and inputs a signal obtained by the logical negation to the OR circuit 111. The OR circuit 111 logically ORs the signal outputted from the NOT circuit 24 and the signal outputted from the NOT circuit 113 and inputs a signal obtained by the logical ORing to the PMOS transistor 121.

Further, the on signal φTR_PMOS2 outputted from the control section 202 for controlling the timing of turning on of the pMOS transistor 122 is inputted to the NOT circuit 114. The NOT circuit 114 operates logical negation of the on signal φTR_PMOS2 and inputs a signal obtained by the logical negation to the OR circuit 112. The OR circuit 112 logically ORs the signal outputted from the NOT circuit 24 and the signal outputted from the NOT circuit 114 and inputs a signal obtained by the logical ORing to the pMOS transistor 122.

In this manner, the OR circuit 111 uses the signal outputted from the NOT circuit 113 to produce the signal to be inputted to the pMOS transistor 121 separately from the signal outputted from the NOT circuit 24 so as to be inputted to the nMOS transistor 123. Meanwhile, the OR circuit 112 uses the signal outputted from the NOT circuit 114 to produce the signal to be inputted to the pMOS transistor 122 separately from the signal to be inputted to the nMOS transistor 123. Consequently, the timing adjustment section 201 can control the pMOS transistors 121 and 122 and the nMOS transistor 123 individually.

The driver section 102 produces the transfer gate signal TR(n) in response to the signals supplied from the timing adjustment section 201. In particular, in the driver section 102, the pMOS transistors 121 and 122 are connected in parallel and the pMOS transistors 121 and 122 and the nMOS transistor 123 are connected in series. The potential VDD1 is connected as a high-level potential to the source of the pMOS transistor 121 while the potential VDD2 is connected as a middle-level potential to the source of the PMOS transistor 122, and the potential VSS is connected as a low-level potential to the source of the nMOS transistor 123.

The signals supplied from the OR circuits 111 and 112 and the NOT circuit 24 of the timing adjustment section 201 are inputted to the gate of the pMOS transistors 121 and 122 and the gate of the nMOS transistor 123, respectively.

The pMOS transistors 121 and 122 and the nMOS transistor 123 are placed into an on or off state in response to the level of the signals supplied to the individual gates thereof so that the potential at a point (hereinafter referred to as three-connection point) at which the drains of the pMOS transistors 121 and 122 and the nMOS transistor 123 are connected to each other is changed to the potential VDD1, the potential VDD2 or the potential VSS. The signal whose potential is changed as just described is applied as the transfer gate signal TR(n) to the transfer gate of the pixels in the nth row of the pixel section. In this manner, the driver section 102 produces and outputs the transfer gate signal TR(n) in response to the signals supplied from the timing adjustment section 201.

The control section 202 produces the timing signals φSTR and φRTR, on signals φTR_PMOS1 and φTR_PMOS2 and so forth individually having the high level or the low level at predetermined timings and outputs the produced signals to the timing adjustment section 201.

It is to be noted that, while the potential VDD2 is connected to the pMOS transistor 122 in FIG. 15, it may be connected alternatively to an nMOS transistor. In this instance, the nMOS transistor to which the potential VDD2 is connected is connected in parallel to the nMOS transistor 123, and a signal obtained by inverting the signal outputted from the OR circuit 112 is inputted to the gate of the nMOS transistor.

Now, an example of timings of the signals relating to the output of the transfer gate signal TR(n) in the pixel driving circuit 200 in FIG. 15 is described with reference to FIG. 16.

Figure 16:
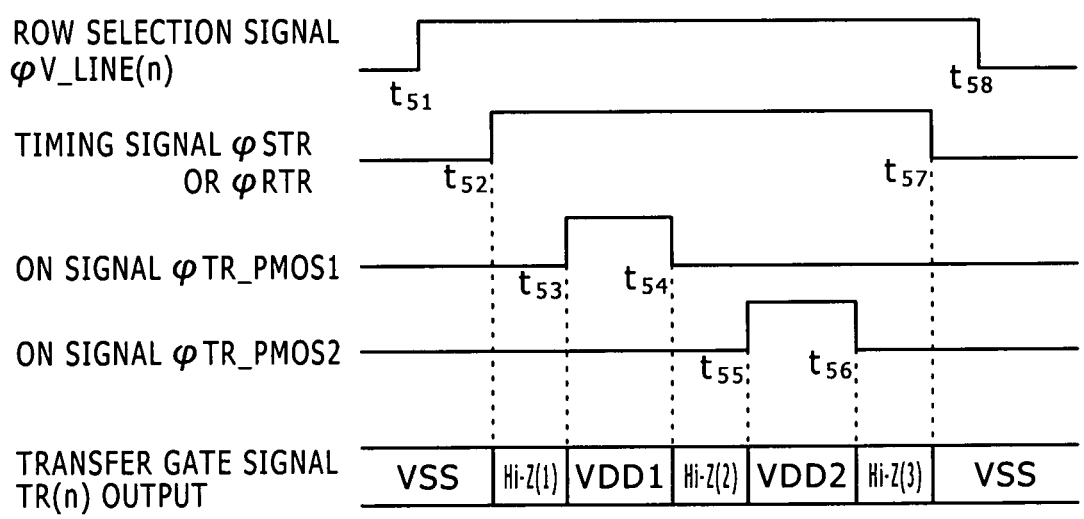
FIG. 16 is a timing chart view illustrating timings of signals in the pixel driving circuit in FIG. 15.

If the level of the row selection signal φV_LINE(n) changes from the low level to the high level at time $t_{51}$ and then the level of the timing signal φSTR or the timing signal φRTR changes from the low level to the high level at time $t_{52}$ as seen in FIG. 16, then the level of the signal to be inputted to the nMOS transistor 123 becomes the low level. Further, at this time, if the level of the on signals φTR_PMOS1 and φTR_PMOS2 is the low level as seen in FIG. 16, then the level of both of the signals to be inputted to the pMOS transistors 121 and 122 changes to the high level. Accordingly, all of the pMOS transistors 121 and 122 and the nMOS transistor 123 are placed into an off state and the three-connection point is placed into a high-impedance (Hi-Z(1)) state as seen in FIG. 16.

Then, if the level of the on signal φTR_PMOS1 changes from the low level to the high level at time $t_{53}$ as seen in FIG. 16, then while the level of the signal to be inputted to the PMOS transistor 122 remains the high level and the level of the signal to be inputted to the nMOS transistor 123 remains the low level, the level of the signal to be inputted to the pMOS transistor 121 changes to the low level. Accordingly, while the pMOS transistor 122 and the nMOS transistor 123 remain in the off state, the pMOS transistor 121 is placed into an on state, and the transfer gate signal TR(n) of the high level of the potential VDD1 is outputted to the pixel section as seen in FIG. 16.

In this manner, when the level of the timing signal φSTR or the timing signal φRTR changes to the high level at time $t_{52}$, although the nMOS transistor 123 is placed into an off state and the outputting of the transfer gate signal TR(n) of the low level of the potential VSS ends, the pMOS transistor 121 or the pMOS transistor 122 is not placed into an on state by time $t_{53}$ at which the level of the on signal φTR_PMOS1 or the on signal φTR_PMOS2 becomes the high level. Therefore, the three-connection point is placed into a high-impedance state.

Then, if the level of the on signal φTR_PMOS1 returns from the high level to the low level at time $t_{54}$ as seen in FIG. 16, then although the level of the signals to be inputted to the PMOS transistor 122 and the nMOS transistor 123 does not change, the level of the signal to be inputted to the pMOS transistor 121 returns to the high level. Accordingly, while the pMOS transistor 122 and the nMOS transistor 123 remain in the off state, the state of the pMOS transistor 121 returns to the off state, and the three-connection point is placed into a high-impedance (Hi-Z(2)) state as seen in FIG. 16.

In this manner, the control section 202 can change the level of the on signal φTR_PMOS1 to the high level while the level of the timing signal φSTR or the timing signal φRTR remains the high level thereby to place the PMOS transistor 121 into an on state to change the level of the transfer gate signal TR(n) to the high level. Accordingly, the control section 202 can control the period during which the level of the on signal φTR_PMOS1 remains the high level while the level of the timing signal φSTR or φRTR remains the high level thereby to control the on period of the pMOS transistor 121 to control the provision/omission, length and timing of starting of the high-level period during which the level of the transfer gate signal TR(n) is the high level.

Then, if the level of the on signal φTR_PMOS2 changes from the low level to the high level at time $t_{55}$ as seen in FIG. 16, then although the level of the signals to be inputted to the pMOS transistor 121 and the nMOS transistor 123 does not change, the level of the signal to be inputted to the pMOS transistor 122 changes to the low level. Accordingly, while the pMOS transistor 121 and the nMOS transistor 123 remain in the off state, the pMOS transistor 122 is placed into an on state, and the transfer gate signal TR(n) of the middle level of the potential VDD2 is outputted to the pixel section as seen in FIG. 16.

Then, if the level of the on signal φTR_PMOS2 returns from the high level to the low level at time $t_{56}$ as seen in FIG. 16, then although the level of the signals to be inputted to the pMOS transistor 121 and the nMOS transistor 123 does not change, the level of the signal to be inputted to the pMOS transistor 122 returns to the high level. Accordingly, while the pMOS transistor 121 and the nMOS transistor 123 remain in the off state, the state of the pMOS transistor 122 returns to the off state, and the three-connection point is placed into a high-impedance (Hi-Z(3)) state as seen in FIG. 16.

In this manner, the control section 202 can change the level of the on signal φTR_PMOS2 to the high level while the level of the timing signal φSTR or the timing signal φRTR is the high level there by to place the pMOS transistor 122 into an on state to change the level of the transfer gate signal TR(n) to the middle level. Accordingly, the control section 202 can control the period during which the level of the on signal φTR_PMOS2 remains the high level while the level of the timing signal φSTR or φRTR remains the high level thereby to control the on period of the pMOS transistor 122 to control the provision/omission, length and timing of starting of the high-level period during which the level of the transfer gate signal TR(n) is the high level.

Then, if the level of the timing signal φSTR or the timing signal φRTR returns from the high level to the low level at time $t_{57}$ as seen in FIG. 16, then the level of the signal to be inputted to the nMOS transistor 123 changes to the high level. Further, at this time, if the level of the on signals φTR_PMOS1 and φTR_PMOS2 remains the low level as seen in FIG. 16, then the level of the signals to be inputted to the PMOS transistors 121 and 122 changes to the high level. Accordingly, while the pMOS transistors 121 and 122 remain in the off state, the nMOS transistor 123 is placed into an on state, and the transfer gate signal TR(n) of the low level of the potential VSS is outputted to the pixel section as seen in FIG. 16.

Then, although the level of the row selection signal φV_LINE(n) changes from the high level to the low level at time $t_{58}$ as seen in FIG. 16, if the level of the timing signal φSTR or the timing signal φRTR and the on signals φTR_PMOS1 and φTR_PMOS2 remain the low level, then the level of the signals to be inputted to the pMOS transistors 121 and 122 and the nMOS transistor 123 remains the high level. Accordingly, the transfer gate signal TR(n) of the low level of the potential VSS continues to be outputted to the pixel section as seen in FIG. 16.

As described above, in FIG. 16, where the level of the transfer gate signal TR(n) is changed from the low level to the high level, from the high level to the middle level or from the middle level to the low level, the level of the transfer gate signal TR(n) is changed so as to have a high-impedance state halfway during the change described above. In this manner, a period during which the three-connection point remains in a high-impedance state can be provided during the change described above thereby to prevent flow of the feedthrough current from the potential VDD to the potential VSS during the change.

Further, as seen in FIG. 16, a period during which the level of both of the on signals φTR_PMOS1 and φTR_PMOS2 is the low level while the level of the timing signal φSTR or φRTR is the high level makes a period during which the three-connection point has a high-impedance state. Accordingly, the changeover timing of the level and the pulse period of the on signals φTR_PMOS1 and φTR_PMOS2 can be changed so as to provide a period of an arbitrary length during which the three-connection point is in a high-impedance state at an arbitrary timing.

For example, it is possible to provide the high-impedance period Hi-Z(1) alone, the period Hi-Z(2) alone, the period Hi-Z(3) alone, the periods Hi-Z(1) and Hi-Z(2) alone, the periods Hi-Z(1) and Hi-Z(3) alone or the periods Hi-Z(2) and Hi-Z(3) alone. Further, where it is desired to attach greater importance to reduction of the high-impedance period to reduce time than to prevention of the feedthrough current, the control section 202 can provide no high-impedance period at all.

It is to be noted that, for the level of the signals, an arbitrary value suitable for the pixel driving circuit 50, 100, 150 or 200 can be set using the register (not shown) provided in the control section 52, 103, 152 or 202.

It is to be noted that, while it is described in the foregoing description given with reference to FIGS. 11 to 14 and 16 that the level of the timing signal φSTR or the timing signal φRTR is the high level or the low level, this description includes a case wherein the level of both of the timing signals φSTR and φRTR is the high level or the low level and another case wherein the level of one of the timing signals φSTR and φRTR is the high level or the low level while the level of the other one of the timing signals φSTR and φRTR usually remains the low level. In the latter case, whichever one of the timing signals φSTR and φRTR has the high level, the high-impedance control can be carried out using the on signal.

It is to be noted that, in the present specification, the steps which describe the program recorded in a recording medium may be but need not necessarily be processed in a time series in the order as described, and include processes which are executed in parallel or individually without being processed in a time series.

While preferred embodiments of the present invention have been described using specific terms, such description is for illustrative purposes alone, and it is to be understood that changes and variations may be made without departing from the spirit or scope of the following claims.

It should be understood by those skilled in the art that various modifications, combinations, sub-combinations and alterations may occur depending on design requirements and other factor in so far as they are within the scope of the appended claims or the equivalents thereof.

What is claimed is:

1. A driving apparatus for driving a pixel, comprising:
a first pMOS type transistor connected to a first potential;
a first nMOS type transistor connected in series to said first pMOS type transistor and connected to a second potential; and
a control section configured to control said first pMOS type transistor and said first nMOS type transistor using separately generated outputs and wherein a first on-signal controls the timing of turning on of one of said first pMOS type transistor and said first nMOS type transistor;
a signal of a potential at a node between said first pMOS type transistor and said first nMOS type transistor being inputted as a driving signal for driving the pixel, and further wherein at least one pair of transistors of a driver for generating a transfer signal, a driver for generating a reset signal and/or a driver for generating a select signal are independently controlled by one or more control signals and an output of an address decoder that are separately applied to the transistors of the at least one pair via different combinations of logic gates such that a desired timing adjustment is provided for the transfer signal, reset signal and the select signal, and further wherein at least one of the control signals applied to the transistors for the driver of each of the transfer, reset and select signals is inverted and the signals applied to the transistors for each driver is derived from a corresponding common signal and at least one additional logic gate is used for changing a timing of one of the control signals for each of the transfer signal, reset and select driver transistors.

2. The driving apparatus according to claim 1, wherein said control section controls said first pMOS type transistor and said first nMOS type transistor individually to control the length and the starting timing of a first potential period during which the potential at the node is the first potential, a second potential period during which the potential at the node is the second potential, and a high-impedance period during which the node is in a high-impedance state.

3. The driving apparatus according to claim 2, wherein said control section controls the length and the starting timing of the first potential period, second potential period and high-impedance period so that the high-impedance period is provided upon transition from one of the first and second potential periods to the other one of the periods.

4. The driving apparatus according to claim 1, further comprising:
a second transistor which is one of a second pMOS type transistor connected in parallel to said first pMOS type transistor and connected to a third potential and a second nMOS type transistor connected in parallel to said first nMOS type transistor and connected to the third potential;
said control section controlling said first pMOS type transistor, first nMOS type transistor and second transistor individually using the first on-signal and a second on-signal for controlling the timing of turning on of said second transistor;
a signal of the potential at a node among said first pMOS type transistor, first nMOS type transistor and second transistor being inputted as the driving signal to the pixel.

5. The driving apparatus according to claim 4, wherein said control section controls said first pMOS type transistor, first nMOS type transistor and second transistor individually to control the length and the starting timing of a first potential period during which the potential at the node is the first potential, a second potential period during which the potential at the node is the second potential, a third potential period during which the potential at the node is the third potential, and a high-impedance period during which the node is in a high-impedance state.

6. The driving apparatus according to claim 5, wherein said control section controls the length and the starting timing of the first, second, third potential periods and high-impedance period such that the high-impedance period is provided upon transition from one to a different one of the first, second and third potential periods.

* * * * *